US012770640B2

(12) United States Patent
Wang

(10) Patent No.: US 12,770,640 B2
(45) Date of Patent: Oct. 20, 2026

(54) TRANSITION PROBABILITY-BASED EMOTION PREDICTION METHOD, APPARATUS, ELECTRONIC DEVICE, COMPUTER-READABLE STORAGE MEDIUM, AND COMPUTER PROGRAM PRODUCT

(71) Applicant: Tencent Technology (Shenzhen) Company Limited, Shenzhen (CN)

(72) Inventor: Yang Wang, Shenzhen (CN)

(73) Assignee: Tencent Technology (Shenzhen) Company Limited, Shenzhen (CN)

(*) Notice: Subject to any disclaimer, the term of this patent is extended or adjusted under 35 U.S.C. 154(b) by 143 days.

(21) Appl. No.: 18/598,056

(22) Filed: Mar. 7, 2024

(65) Prior Publication Data

US 2024/0212705 A1 Jun. 27, 2024

Related U.S. Application Data

(63) Continuation of application No. PCT/CN2023/120056, filed on Sep. 20, 2023.

(30) Foreign Application Priority Data

Oct. 31, 2022 (CN) ........................ 202211351904.X

(51) Int. Cl.
*G10L 25/63* (2013.01)
*G06F 40/30* (2020.01)
(Continued)

(52) U.S. Cl.
CPC .............. *G10L 25/63* (2013.01); *G06F 40/30* (2020.01); *G10L 15/26* (2013.01); *G10L 25/30* (2013.01)

(58) Field of Classification Search
CPC ......... G10L 15/04; G10L 15/26; G10L 25/30; G10L 25/63; G10L 25/66; G06F 40/30
(Continued)

(56) References Cited

U.S. PATENT DOCUMENTS 10,198,506 B2 * 2/2019 Qiao ..................... G06F 40/211
2006/0167694 A1 * 7/2006 Mitsuyoshi ............. G06F 16/30 707/E17.058
(Continued)

FOREIGN PATENT DOCUMENTS

CN 104731770 A 6/2015
CN 108346436 A 7/2018
(Continued)

OTHER PUBLICATIONS

Cirakman, et al. "Online speaker emotion tracking with a dynamic state transition model." 2016 23rd International Conference on Pattern Recognition (ICPR). IEEE, Dec. 2016, pp. 307-312. (Year: 2016).*
(Continued)

*Primary Examiner* — James S Wozniak
(74) *Attorney, Agent, or Firm* — Banner & Witcoff, Ltd.

(57) ABSTRACT

A data processing method and apparatus, an electronic device, a computer-readable storage medium, and a computer program product are provided for emotion recognition scenarios such as a cloud technology, artificial intelligence (AI), intelligent transportation, a game, and a vehicle. Data processing methods for emotion recognition includes: performing emotion prediction on information for recognition for a current round to obtain a current emotion direction and a first probability of each of a plurality of candidate emotions, the current emotion direction being a direction of an emotion of the information for recognition; determining a second probability corresponding to each candidate emotion
(Continued)

from an emotion transition relationship based on the current emotion direction; integrating the first and second probabilities to obtain a target probability of the candidate emotion; and determining an emotion recognition result based on the target probability corresponding to each of the plurality of candidate emotions.

17 Claims, 11 Drawing Sheets

(51) Int. Cl.
*G10L 15/26* (2006.01)
*G10L 25/30* (2013.01)

(58) Field of Classification Search
USPC .................................................. 704/251, 257
See application file for complete search history.

(56) References Cited

U.S. PATENT DOCUMENTS

| | | | | |
|---|---|---|---|---|
| 2016/0019434 | A1* | 1/2016 | Caldwell | G06V 10/462 345/474 |
| 2019/0027132 | A1* | 1/2019 | Liu | G10L 15/22 |
| 2019/0109878 | A1* | 4/2019 | Boyadjiev | G06N 5/022 |
| 2020/0013428 | A1* | 1/2020 | Luo | G10L 15/02 |
| 2020/0043514 | A1* | 2/2020 | Liu | G10L 15/22 |
| 2020/0090067 | A1* | 3/2020 | Anders | G06F 18/214 |
| 2020/0251129 | A1 | 8/2020 | Togawa et al. | |
| 2021/0193169 | A1* | 6/2021 | Faizakof | G10L 25/63 |
| 2021/0344560 | A1* | 11/2021 | Alameh | A61B 5/165 |
| 2022/0300251 | A1 | 9/2022 | Wang et al. | |
| 2022/0350971 | A1* | 11/2022 | Shek | H04N 21/8113 |
| 2023/0120262 | A1* | 4/2023 | Matic | A61B 5/681 600/301 |
| 2023/0376697 | A1* | 11/2023 | Chow | G06F 16/90332 |
| 2024/0078731 | A1* | 3/2024 | Beith | G06T 13/205 |
| 2024/0086622 | A1* | 3/2024 | Robert Jose | G06F 40/247 |

FOREIGN PATENT DOCUMENTS

| | | |
|---|---|---|
| CN | 110866112 A | 3/2020 |
| CN | 111816211 A | 10/2020 |
| CN | 112053205 A | 12/2020 |
| CN | 114282549 A | 4/2022 |

OTHER PUBLICATIONS

Martinez, Bryan E., Jaime Cerda, and Salvador Ramirez-Zavala. “Emotional State Prediction Using Speech Signals.” 2019 International Conference on Computational Science and Computational Intelligence (CSCI). IEEE, Dec. 2019, pp. 388-393. (Year: 2019).*

Quan, Changqin, et al. “Weighted high-order hidden Markov models for compound emotions recognition in text.” Information Sciences 329. 2016, pp. 581-596. (Year: 2016).*

Yeh, Sung-Lin, Yun-Shao Lin, and Chi-Chun Lee. “A dialogical emotion decoder for speech emotion recognition in spoken dialog.” ICASSP 2020-2020 IEEE International conference on acoustics, speech and signal processing (ICASSP). IEEE, May 2020, pp. 6479-6483. (Year: 2020).*

Jan. 11, 2024—(WO) Search Report—App PCT/CN2023/120056.

May 1, 20264—CN First Office Action—CN Application No. 202211351904.X.

* cited by examiner

Message interface 16-1

Battle scene 16-12

Message box 16-11

TRANSITION PROBABILITY-BASED EMOTION PREDICTION METHOD, APPARATUS, ELECTRONIC DEVICE, COMPUTER-READABLE STORAGE MEDIUM, AND COMPUTER PROGRAM PRODUCT

RELATED APPLICATION

This application claims priority to Chinese Patent Application No. 202211351904.X, filed on Oct. 31, 2022, and is a continuation of PCT/CN2023/120056, filed on Sep. 20, 2023, both of which are incorporated herein by reference in its entirety.

TECHNICAL FIELD

Aspects described herein relate to artificial intelligence (AI) technologies in the field of computer application, and in particular, to a data processing method and apparatus, an electronic device, a computer-readable storage medium, and a computer program product.

BACKGROUND

Emotion recognition originally referred to one individual's recognition of an emotion of another individual, but now mostly refers to automatic identification of an emotion state of the individual through artificial intelligence (AI) by obtaining a physiological or non-physiological signal of the individual. Emotion recognition is an important component of affective computing. Research in emotion recognition includes aspects such as face expression recognition, speech recognition, heart rate recognition, behavior recognition, text recognition, and physiological signal recognition. An emotion state of a user is determined through the foregoing aspects.

Emotion recognition is a component of the affective computing, and is usually directly performed on information for recognition, to recognize a current emotion. However, during the emotion recognition process described above, the direct emotion recognition is typically based on a single type of data, which affects accuracy of the emotion recognition.

SUMMARY

Aspects described herein provide a data processing method and apparatus, an electronic device, a computer-readable storage medium, and a computer program product, which can improve accuracy of emotion recognition.

Aspects described herein provide a data processing method, the method being performed by an electronic device and including:

- performing emotion prediction on information for recognition for a current round to obtain a current emotion direction and a first probability of each of a plurality of candidate emotions, the current emotion direction being a direction of an emotion of the information for recognition, the candidate emotion being a preset emotion type, and a type of the direction of the emotion including positive, negative, and directionless;
- determining a second probability corresponding to each candidate emotion from an emotion transition relationship based on the current emotion direction, the emotion transition relationship representing a probability of transitioning from a historical emotion to the candidate emotion based on an emotion direction, the historical emotion being an emotion predicted through an emotion prediction process before the current round;
- integrating the first probability and the second probability to obtain a target probability of the candidate emotion; and
- determining an emotion recognition result of the information for recognition based on the target probability corresponding to each of the plurality of candidate emotions.

Aspects described herein provide a data processing apparatus, including:

- an emotion prediction module, configured to perform emotion prediction on information for recognition for a current round to obtain a current emotion direction and a first probability of each of a plurality of candidate emotions, the current emotion direction being a direction of an emotion of the information for recognition, and the candidate emotion being a preset emotion type;
- a transition prediction module, configured to determine a second probability corresponding to each candidate emotion from an emotion transition relationship based on the current emotion direction, the emotion transition relationship representing a probability of transitioning from a historical emotion to the candidate emotion based on an emotion direction, the historical emotion being an emotion predicted through an emotion prediction process before the current round;
- a probability integration module, configured to integrate the first probability and the second probability to obtain a target probability of the candidate emotion; and
- a result determination module, configured to determine an emotion recognition result of the information for recognition based on the target probability corresponding to each of the plurality of candidate emotions.

Aspects described herein provide an electronic device for performing data processing based on an emotion, including:

- a memory, configured to store a computer-executable instruction; and
- a processor, configured to implement the data processing method provided in the embodiments of this application when executing the computer-executable instruction stored in the memory.

Aspects described herein provide a computer-readable storage medium, having a computer-executable instruction stored therein, the computer-executable instruction, when executed by a processor, implementing the data processing method provided in the embodiments of this application.

Aspects described herein provide a computer program product, including a computer program or a computer-executable instruction, the computer program or the computer-executable instruction, when executed by a processor, implementing the data processing method provided in the embodiments of this application.

According to one or more aspects, during the emotion prediction, the first probability corresponding to each candidate emotion for a single round and a direction of a current emotion are first predicted by using current information for recognition. Next, the second probability of transitioning from the historical emotion to the candidate emotion is determined based on the direction of the current emotion. Finally, through integration of the first probability and the second probability into the target probability of the candidate emotion, a final emotion recognition result is obtained, so that the emotion recognition result is not only based on a prediction result of the single round, but also combined with the probability of transitioning from the historical emotion to the candidate emotion. Therefore, the data used in obtaining the emotion recognition result is diverse in time and space. Therefore, the accuracy of emotion recognition can be improved.

DESCRIPTION OF EMBODIMENTS

Figure 1:
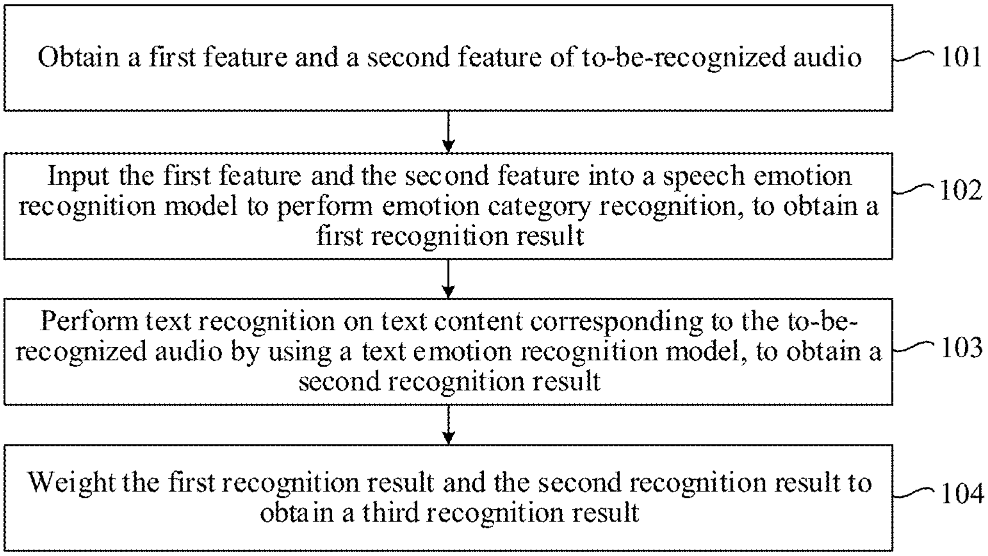
FIG. 1 is a schematic diagram of an exemplary emotion recognition process.

Aspects of the disclosure are described in detail with reference to accompany drawings. The descriptions are not to be construed as limiting. Any aspects obtainable by a person of ordinary skill in the art without creative efforts fall within the scope of this disclosure.

In the following description, a term "some embodiments" involved describes subsets of all possible embodiments, but it may be understood that "some embodiments" may be the same subset or different subsets of all the possible embodiments, and may be combined with each other without conflict.

In the following description, a term "first/second/third" involved is merely used for distinguishing between similar objects and does not represent a specific order of objects. It may be understood that "first/second/third" may be transposed for a specific order or an order when allowed, so that the embodiments of this application described herein can be implemented in an order other than those illustrated or described herein.

Unless otherwise defined, meanings of all technical and scientific terms used in the embodiments of this application are the same as those generally understood by a person skilled in the technical field. Terms used in the following description are not intended to limit this application.

Collection and processing of related data (for example, information for recognition in an audio or text form) are to strictly comply with requirements of relevant national laws and regulations, informed consent or independent consent of a personal information subject is obtained, and subsequent data use and processing behaviors are carried out within the scope of authorization of laws and regulations and the personal information subject.

Certain nouns and terms involved in this disclosure are explained below.

1) Artificial Intelligence (AI) is a theory, a method, a technology, and an application system that uses a digital computer or a machine controlled by the digital computer to simulate, extend, and expand human intelligence, perceive the environment, acquire knowledge, and use knowledge to obtain an optimal result.
2) Machine learning (ML) is a multi-disciplinary field of study, involving a plurality of disciplines such as the probability theory, statistics, approximation theory, convex analysis, algorithm complexity theory, and the like. ML specializes in how a computer simulates or implements a human learning behavior to obtain new knowledge or skills, and reorganizes an existing knowledge structure to continuously improve its own performance. ML is the core of AI and is a fundamental way to make computers intelligent, which is applied in all fields of AI. ML generally includes technologies such as an artificial neural network, a confidence network, reinforcement learning, transfer learning, and inductive learning.
3) An artificial neural network is a mathematical model that imitates a structure and functions of a biological neural network. An exemplary structure of the artificial neural network includes a graph convolutional network (GCN, a neural network configured to process data of a graph structure), a deep neural network (DNN), a convolutional neural network (CNN), a recurrent neural network (RNN), a neural state machine (NSM), and a phase-functional neural network (PFNN), and the like. An emotion prediction model and a to-be-trained prediction model described herein are both models corresponding to the artificial neural network.

Exemplarily, to implement emotion recognition, emotion recognition is usually directly performed on information for recognition, to recognize a current corresponding emotion. During the emotion recognition process described above, the direct emotion recognition performed on the information for recognition is based on a single type of data, which affects accuracy of the emotion recognition.

In addition, when the information for recognition is to-be-recognized audio, emotion recognition may also be implemented based on physical information of the information for recognition. FIG. 1 is a schematic diagram of an exemplary emotion recognition process. As shown in FIG. 1, the exemplary emotion recognition process includes step 101 to step 104. The steps are respectively described below.

Step 101: Obtain a first feature and a second feature of the to-be-recognized audio.

Figure 2:
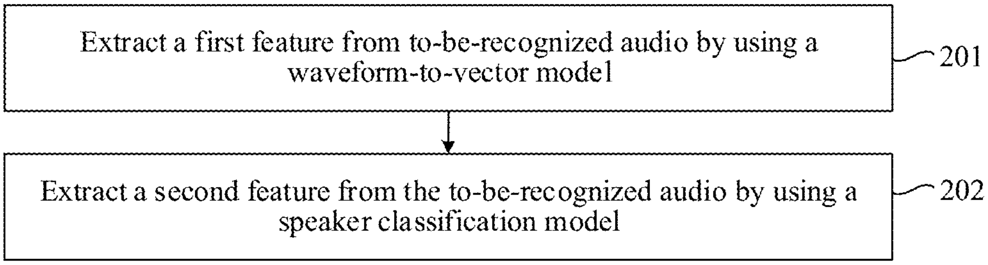
FIG. 2 is a schematic diagram of an exemplary feature obtaining process.

Exemplarily, for a process of obtaining the first feature and the second feature, reference is made to FIG. 2. FIG. 2 is a schematic diagram of an exemplary feature obtaining process. As shown in FIG. 2, the exemplary feature obtaining process includes step 201 and step 202. Step 201 includes extracting the first feature from the to-be-recognized audio by using a waveform-to-vector model (a Wav2vec model). Step 202 includes extracting the second feature from the to-be-recognized audio by using a speaker classification model. Herein, the first feature represents a feature related to a waveform of the to-be-recognized audio, and the second feature represents a feature related to a speaker of the to-be-recognized audio.

Step 102: Input the first feature and the second feature into a speech emotion recognition model to perform emotion category recognition, to obtain a first recognition result.

Exemplarily, emotion feature decoupling is performed by using the first feature and the second feature, and the emotion category recognition is performed by using an emotion feature obtained through decoupling.

Step 103: Perform text recognition on text content corresponding to the to-be-recognized audio by using a text emotion recognition model, to obtain a second recognition result.

Step 104: Weight the first recognition result and the second recognition result to obtain a third recognition result.

Since the emotion recognition described in FIG. 1 and FIG. 2 is a process of recognizing an emotion for a single round or pass based on the to-be-recognized audio, the emotion recognition performed is based on a single type of data, which may affect the accuracy of the emotion recognition. In addition, although the emotion recognition described in FIG. 1 and FIG. 2 combines a speech spectrum feature and a voiceprint feature (which are referred to as the first feature and the second feature) extracted based on physical information of audio and the text content, the accuracy of the emotion recognition may still be affected since precision of the physical information of the audio during the emotion recognition may be less than a precision threshold.

Due to the foregoing problems, aspects described herein provide a data processing method, a data processing apparatus, an electronic device, a computer-readable storage medium, and a computer program product, which can improve the accuracy of emotion recognition. Example application of an electronic device (which is referred to as an emotion processing device for short below) for performing data processing based on an emotion is described below. An emotion processing device may be implemented as various types of terminals such as a smartphone, a smartwatch, a notebook computer, a tablet computer, a desktop computer, a smart home appliance, a set-top box, a smart onboard device, a portable music player, a personal digital assistant, a dedicated messaging device, an intelligent voice interaction device, a portable game device, and a smart speaker, or may be implemented as a server. An example application when the emotion processing device is implemented as a server is described below.

Figure 3:
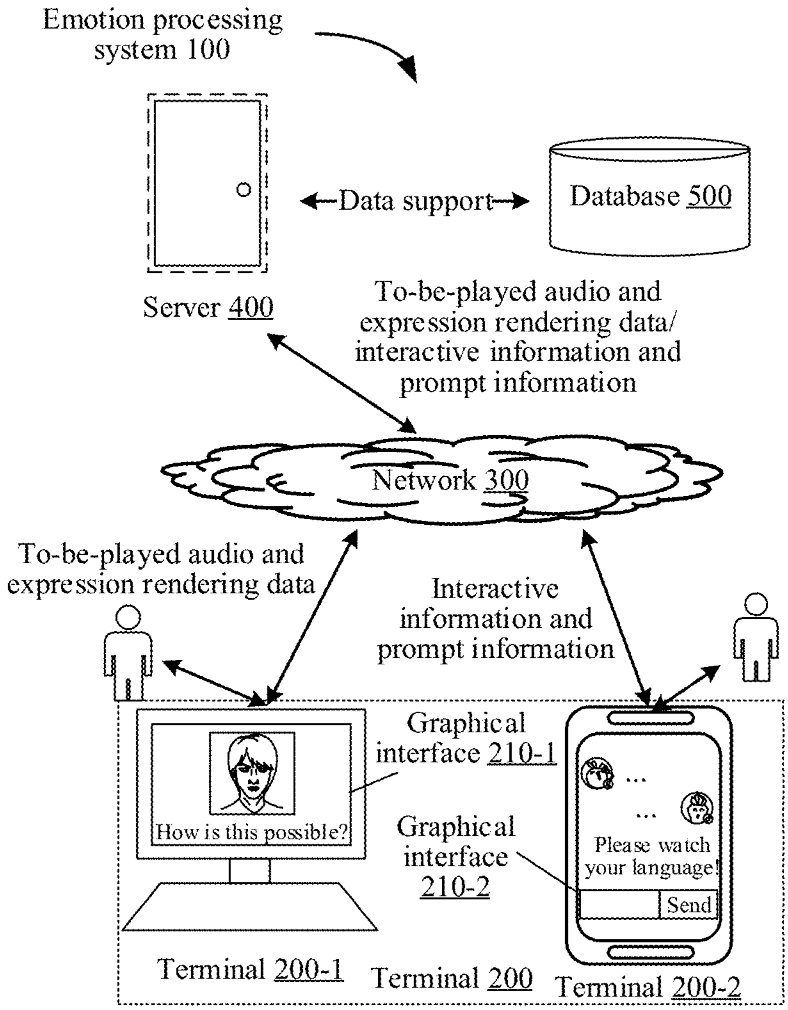
FIG. 3 is a schematic diagram of an architecture of an emotion processing system according to one or more aspects described herein.

FIG. 3 is a schematic diagram of an example architecture of an emotion processing system. As shown in FIG. 3, to support an emotion processing application, in an emotion processing system 100, a terminal 200 (a terminal 200-1 and a terminal 200-2 that are exemplarily shown) is connected to a server 400 through a network 300. The network 300 may be a wide area network, a local area network, or a combination thereof. In addition, the emotion processing system 100 further includes a database 500 configured to provide data support to the server 400. In addition, FIG. 3 shows a case in which the database 500 is independent of the server 400. Furthermore, the database 500 may also be integrated in the server 400, but is not limited to such a configuration.

The terminal 200 is configured to receive, through the network 300, to-be-played audio (which may be referred to as information for recognition) and expression rendering data of a to-be-presented virtual object transmitted by the server 400. The terminal 200 is further configured to, during playback of the to-be-played audio, display corresponding text information (for example, "How is this possible?") on a graphical interface (a graphical interface 210-1 of the terminal 200-1 that is exemplarily shown), and render an expression of the to-be-presented virtual object based on the expression rendering data. Alternatively, the terminal is configured to transmit interactive information (which may be referred to as information for recognition) to the server 400 through the network 300, receive, through the network 300, prompt information transmitted by the server 400, and present the prompt information (for example, "Please watch your language!") on a graphical interface (a graphical interface 210-2 of the terminal 200-2 that is exemplarily shown).

The server 400 may be configured to: perform emotion prediction on information for recognition for a current round or pass to obtain a current emotion direction and a first probability of each of a plurality of candidate emotions, the current emotion direction being a direction of an emotion of the information for recognition; determine a second probability corresponding to each candidate emotion from an emotion transition relationship based on the current emotion direction, the emotion transition relationship representing a probability of transitioning from a historical emotion to the candidate emotion based on an emotion direction; integrate the first probability and the second probability to obtain a target probability of the candidate emotion; and determine an emotion recognition result of the information for recognition based on the target probability corresponding to each of the plurality of candidate emotions. The server may be further configured to generate the expression rendering data of the to-be-presented virtual object based on the emotion recognition result, and transmit the to-be-played audio and the expression rendering data of the to-be-presented virtual object to the terminal 200 through the network 300, or may be further configured to receive the interactive information transmitted by the terminal 200 through the network 300, determine an interactive emotion state based on the emotion recognition result, and transmit the prompt information to the terminal 200 through the network 300 when the interactive emotion state is a to-be-reviewed emotion state.

According to some aspects, the data processing method may be applied to autonomous driving technology. Autonomous driving technology may include implementing autonomous driving of a vehicle without an operation of a driver. Autonomous driving technology usually includes technologies such as a high definition map, environmental perception, computer vision, behavioral decision making, path planning, and motion control. Autonomous driving may include a plurality of development paths such as bicycle intelligence, vehicle road coordination, and networked cloud control. Autonomous driving technology may have broad application, such as to fields like logistics, public transportation, taxis, and smart transportation, and is to be further developed in the future. Through recognition of an emotion state carried in voice of a user, services such as behavioral decision making and path planning of autonomous driving may be provided to the user.

According to some aspects, the server 400 may be an independent physical server, or may be a server cluster formed by a plurality of physical servers or a distributed system, and may further be a cloud server providing basic cloud computing services such as cloud service, a cloud database, cloud computing, a cloud function, cloud storage, a network service, cloud communication, a middleware service, a domain name service, a security service, a content delivery network (CDN), and a big data and artificial intelligence platform. The terminal 200 may be a smartphone, a smartwatch, a notebook computer, a tablet computer, a desktop computer, a smart television, a set-top box, a smart onboard device, a portable music player, a personal digital assistant, a dedicated messaging device, a portable game device, a smart speaker, and the like, but is not limited thereto. The terminal and the server may be directly or indirectly connected in a manner of wired or wireless communication, which is not limited in this embodiment of this application.

Figure 4:
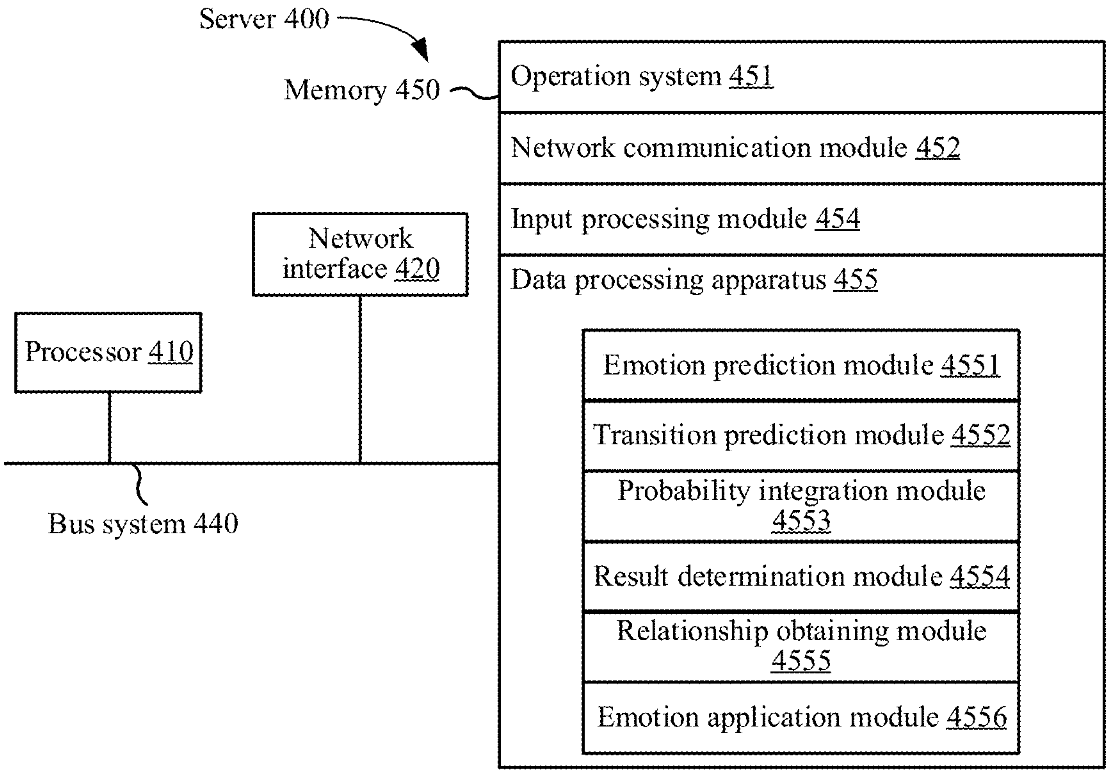
FIG. 4 is a schematic diagram of a composition structure of a server in FIG. 3 according to one or more aspects described herein.

FIG. 4 is a schematic diagram of a composition structure of an example server in FIG. 3. The server 400 shown in FIG. 4 includes at least one processor 410, a memory 450, and at least one network interface 420. Various components in the server 400 are coupled together through a bus system 440. For example, the bus system 440 may be configured to implement connection and communication between the components. In addition to a data bus, the bus system 440 may further include a power bus, a control bus, and a status signal bus. However, for clarity, various buses are marked as the bus system 440 in FIG. 4.

The processor 410 may be an integrated circuit chip with a signal processing capability, for example, a general-purpose processor, a digital signal processor (DSP), another programmable logic device (PLD), a discrete gate or a transistor logic device, a discrete hardware component, or the like. The general-purpose processor may be a microprocessor, any conventional processor, or the like.

The memory 450 may be removable, non-removable, or a combination thereof. An exemplary hardware device includes a solid-state memory, a hard disk driver, an optical disk driver, and the like. In some examples, memory 450 may include one or more storage devices that are physically located away from the processor 410.

The memory 450 may include a volatile memory or a non-volatile memory, or may include both volatile memory and non-volatile memory. The non-volatile memory may be a read-only memory (ROM). The volatile memory may be a random access memory (RAM). The memory 450 may include any suitable type of memory.

In some arrangements, the memory 450 can store data and support various operations. Examples of the data include a program, a module, and a data structure, or a subset or a superset thereof. Example descriptions are given below.

An operation system 451 may include system programs configured to process various basic system services and perform hardware-related tasks, for example, a framework layer, a core library layer, and a driver layer, which are used for implementing various basic services and process hardware-based tasks.

A network communication module 452 may be configured to reach or communicate another electronic device through one or more (wired or wireless) network interfaces 420. An exemplary network interface 420 includes a Bluetooth interface, a wireless fidelity (Wi-Fi) interface, a universal serial bus (USB) interface, and the like.

An input processing module 454 may be configured to detect one or more user inputs or interactions from one of the one or more input apparatuses 432 and translate the detected inputs or interactions.

In some arrangements, the data processing apparatus may be implemented by software. FIG. 4 shows example data processing apparatus 455 stored in the memory 450, which may be software in the form of a program and a plug-in, including the following software modules: an emotion prediction module 4551, a transition prediction module 4552, a probability integration module 4553, a result determination module 4554, a relationship obtaining module 4555, and an emotion application module 4556. The modules may be logical and therefore may be arbitrarily combined or further split based on implemented functions. Functions of the modules are described below.

In some arrangements, the data processing apparatus may be implemented by hardware. In an example, the apparatus may be a processor in the form of a hardware decoding processor, which is programmed to perform the data processing method provided in the embodiments of this application. For example, the processor in the form of the hardware decoding processor may use one or more application specific integrated circuits (ASICs), a DSP, a PLD, a complex PLD (CPLD), a field-programmable gate array (FPGA), or another electronic element.

In some arrangements, the terminal or the server may implement the data processing method described herein by running a computer program. For example, the computer program may be an intrinsic program or a software module in an operating system, may be a native application (APP), that is, a program that needs to be installed in the operating system to run, such as a live streaming APP, a game APP, a virtual human APP, or an instant messaging APP; or may be an applet, that is, a program that only needs to be downloaded to a browser environment to run; and may further be an applet that can be embedded in any APP. The foregoing computer program may be an APP, a module, or a plug-in of any form.

The data processing method provided in the embodiments of this application is described below in combination with exemplary application and implementation of the emotion processing device provided in the embodiments of this application. In addition, the data processing methods described herein may be applied to various emotion recognition scenarios such as a cloud technology, AI, smart transportation, a game, and a vehicle. An electronic device configured to implement the data processing methods described herein may be a terminal, a server, or a combination thereof. Therefore, an execution subject of each step is not described below.

Figure 5:
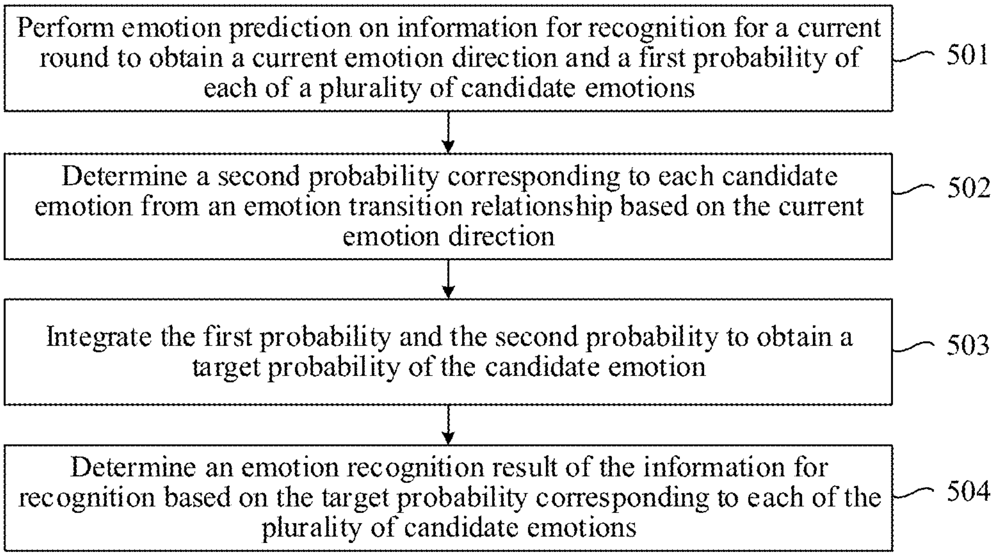
FIG. 5 is a schematic flowchart I of a data processing method according to one or more aspects described herein.

FIG. 5 is a schematic flowchart of an example data processing method. A description is provided below in combination with steps shown in FIG. 5.

Step 501: Perform emotion prediction on information for recognition for a current round or pass to obtain a current emotion direction and a first probability of each of a plurality of candidate emotions.

According to some aspects, when an emotion processing device obtains an object on which emotion recognition is to be performed, an emotion-based data processing process may be triggered. The object on which emotion recognition is to be performed may be the information for recognition for the current round or pass. During performing of the emotion-based data processing for the information for recognition, the emotion processing device may first perform emotion prediction based on the information for recognition.

In this case, the emotion processing device can obtain a probability corresponding to each of the plurality of candidate emotions by performing the emotion prediction on the information for recognition, which may be referred to as the first probability, and can also obtain a direction of a current emotion, which may be referred to as the current emotion direction.

In some example, in a case that at least one emotion prediction process has been performed before a current emotion prediction process, each emotion prediction process which generates an emotion recognition result is used as a complete round or pass, and a current round refers to a round in which a current emotion prediction process is being performed.

The information for recognition may be to-be-recognized audio (for example, audio of a sentence), may be to-be-recognized text (for example, a text of a sentence or a piece of information), may be a combination of to-be-recognized audio and to-be-recognized text, or the like, and is not limited to these examples. The emotion prediction is a process of determining an emotion expressed by the information for recognition, which may be implemented based on semantics of the information for recognition, based on physical information (for example, an audio waveform and a timbre) of the information for recognition, based on a combination of the semantics and the physical information, or the like, and is not limited to these examples. Herein, the emotion processing device may preset or predefine a plurality of candidate emotions. Each candidate emotion represents a preset or predefined emotion type. Emotion types may be, for example, normal, wrath, disgust, depression, excitement, joy, and surprise. In addition, the first probability may represent a probability that an emotion of the information for recognition is each candidate emotion, and the probability that the emotion of the information for recognition is each candidate emotion may be positively correlated with the first probability. The current emotion direction may be a direction in which a historical emotion is transitioned to an emotion at a current moment. Types of the direction of the emotion may be, for example, positive (which represents directions corresponding to positive emotions such as excitement, joy, surprise, and smile), negative (which represents directions corresponding to negative emotions such as wrath, disgust, sadness, contempt, irony, and anger), or directionless (directionless may be referred to as empty, and represents emotionless). The emotion processing device may perform the emotion prediction on the information for recognition. The obtained first probability of each candidate emotion may be an emotion prediction result for a single round or pass.

In one example, the emotion processing device may perform emotion prediction on "You are excellent" (which is referred to as the information for recognition), and an obtained result is positive (which is referred to as a current emotion direction): normal (0.01), wrath (0.10), disgust (0.50), depression (0.02), excitement (0.70), joy (0.90), and surprise (0.80). A numerical value in parentheses of each candidate emotion is referred to as the first probability of the candidate emotion.

In such examples, a plurality of candidate emotion types are set, which can further refine predicted emotion results. The emotion result corresponding to the information for recognition is obtained based on the emotion direction and the candidate emotion, so that the emotion prediction result for the single round can be more accurate.

Step 502: Determine a second probability corresponding to each candidate emotion from an emotion transition relationship based on the current emotion direction.

According to some aspects, performing the emotion-based data processing by the emotion processing device includes not only performing a single round of emotion prediction, but also obtaining a probability of transitioning from a historical emotion to the candidate emotion. Herein, the emotion processing device obtaining the probability of transitioning from the historical emotion to the candidate emotion may be implemented based on the emotion transition relationship. The emotion transition relationship may be stored in the emotion processing device, may be obtained by the emotion processing device from another device (for example, a storage device such as a database), may be obtained from received information (for example, an emotion recognition request), and the like, and is not limited by these examples. Since the emotion transition relationship may represent the probability of transitioning from the historical emotion to the candidate emotion based on the emotion direction, the emotion processing device can determine the probability of transitioning to each candidate emotion based on the historical emotion and the current emotion direction. The second probability is obtained based on the determined probability of transition, which represents a probability of transitioning from the historical emotion to the candidate emotion, and the probability of transitioning from the historical emotion to the candidate emotion may be positively correlated with the second probability.

In some examples, a historical emotion is an emotion predicted through an emotion prediction process before the current round, and may be an emotion of context information of the information for recognition. The context information is an emotion recognition object for the emotion prediction process before the current round. Herein, the historical emotion may be emotions predicted the most recent M (M is a positive integer) times before the current moment. In addition, the emotion predicted the most recent M times may be an optimal emotion, or may be a plurality of emotions screened out, for example, disgust, for another example, disgust and wrath, and is not limited to these examples. The optimal emotion may be an emotion with the highest probability among a plurality of historically predicted emotions. The plurality of emotions screened out may be L emotions of the plurality of historically predicted emotions which have top probabilities, L being a positive integer greater than 1. The emotion transition relationship includes a probability of transitioning from each historically predicted emotion to each candidate emotion and a transition probability in each emotion direction. For example, when there are C1 types of the emotion predicted in a previous round, C2 types of the candidate emotion, and C3 types of the emotion direction, the emotion transition relationship includes at most C1*C2*C3 transition relationships. In addition, each transition relationship among the emotion transition relationships may be expressed as a quadruple form. The quadruple of the emotion transition relationship includes a historically predicted emotion, a candidate emotion, an emotion direction, and a transition probability. The quadruple represents a transition probability of transitioning to a candidate emotion during transition of a historically predicted emotion to an emotion direction. The historically predicted emotion in the quadruple may include historically predicted emotions for at least one round.

Figure 6:
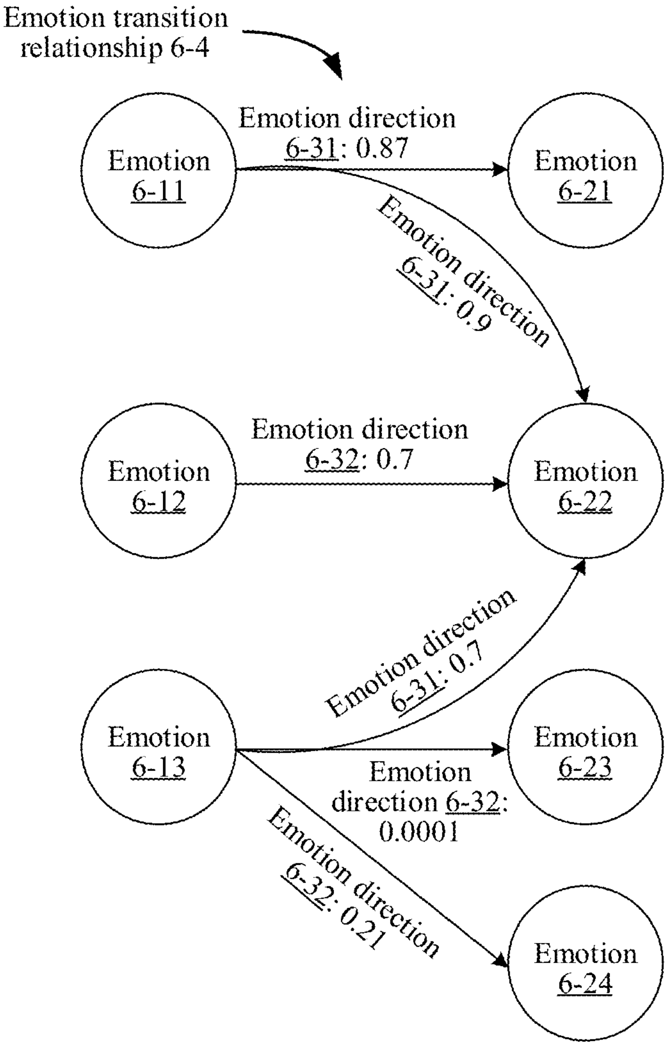
FIG. 6 is a schematic diagram of an exemplary emotion transition relationship according to one or more aspects described herein.

FIG. 6 is a schematic diagram of an exemplary emotion transition relationship. As shown in FIG. 6, historical emotions include an emotion 6-11 to an emotion 6-13. An emotion 6-21 to an emotion 6-24 are candidate emotions, and an emotion direction 6-31 is a current emotion direction. The emotion 6-11 to the emotion 6-13, the emotion 6-21 to the emotion 6-24, the emotion direction 6-31, and the emotion direction 6-32 correspond to an emotion transition relationship 6-4.

In one or more examples, the probability of transitioning from the historical emotion to the candidate emotion may be represented by using the second probability, and information between an emotion carried in current information for recognition and the historical emotion may be obtained by using the second probability, which can improve accuracy of predicting an emotion recognition result of the current information for recognition.

Step 503: Integrate the first probability and the second probability to obtain a target probability of the candidate emotion.

According to some examples, the emotion processing device may integrate the first probability and the second probability after obtaining the first probability and the second probability for each candidate emotion, and determine an obtained integration result as a final probability of the candidate emotion, which may be referred to as the target probability.

According to one or more aspects, the emotion processing device may integrate the first probability and the second probability into the target probability in a manner of accumulation, weighted summation, averaging, or the like, and is not limited to these examples.

According to one or more aspects, through integration of the first probability and the second probability, the emotion prediction result for a single round may be integrated with an emotion prediction result for another round, and accuracy of a plurality of consecutive rounds of emotion prediction may be improved by using historical state information.

Step 504: Determine an emotion recognition result of the information for recognition based on the target probability corresponding to each of the plurality of candidate emotions.

According to one or more aspects, after the target probability corresponding to each of the plurality of candidate emotions is obtained, the emotion processing device may directly determine a plurality of target probabilities in a one-to-one correspondence with the plurality of candidate emotions as the emotion recognition results, and may also screen the target probabilities corresponding to the plurality of candidate emotions arranged in reverse order for the emotion recognition result based on a threshold, a quantity, and the like, and is not limited to these examples.

In some examples, the emotion recognition result may represent an emotion expressed by the information for recognition, an optimal candidate emotion (that is, a candidate emotion with the highest probability) and a corresponding target probability, at least two candidate emotions with a target probability being greater than a specified threshold and target probabilities respectively corresponding to the candidate emotions, and/or target probabilities respectively corresponding to all candidate emotions.

During the emotion prediction, the first probability corresponding to each candidate emotion for a single round and a direction of a current emotion may be first predicted by using current information for recognition. Next, the second probability of transitioning from the historical emotion to the candidate emotion may be determined based on the direction of the current emotion. Finally, through integration of the first probability and the second probability into the target probability of the candidate emotion, a final emotion recognition result may be obtained, so that the emotion recognition result is not only based on a prediction result of the single round, but also combined with the probability of transitioning from the historical emotion to the candidate emotion. Therefore, the data used in obtaining the emotion recognition result may be diverse in time and space. Therefore, the accuracy of emotion recognition can be improved.

Figure 7:
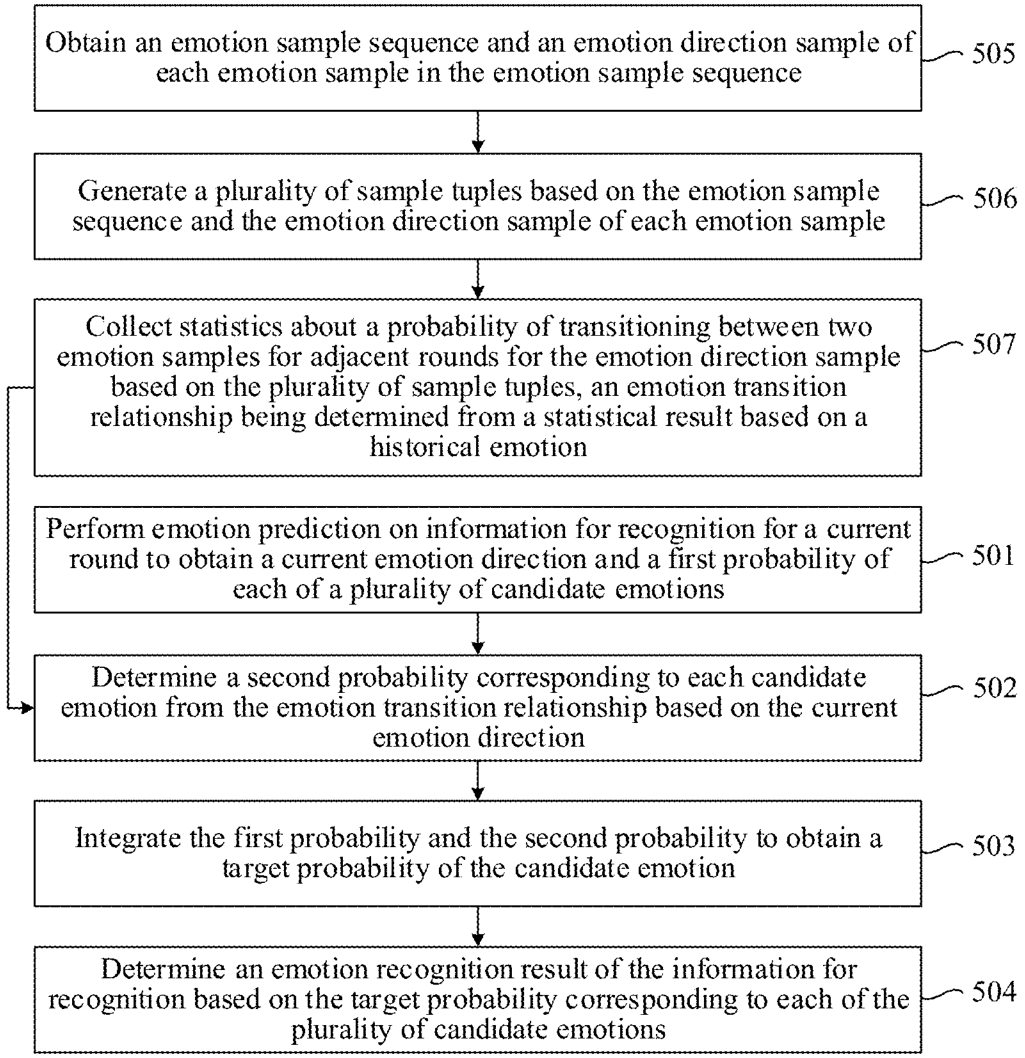
FIG. 7 is a schematic flowchart II of a data processing method according to one or more aspects described herein.

FIG. 7 is a schematic flowchart of an example data processing method. As shown in FIG. 7, step 505 to step 507 are included before step 502. In other words, before the emotion processing device determines the second probability corresponding to each candidate emotion from the emotion transition relationship based on the current emotion direction, the data processing method may include step 505 to step 507. Steps are described below.

Step 505: Obtain an emotion sample sequence and an emotion direction sample of each emotion sample in the emotion sample sequence.

In one or more examples, the emotion sample sequence is a plurality of labeled round-consecutive emotion samples. Each emotion sample is an emotion and sample data. In other words, the emotion sample is an emotion of the sample data. The emotion direction sample is a direction of an emotion obtained by labeling each emotion sample, for example, positive, negative, or empty (which represents emotionless). Herein, the emotion processing device obtains the emotion sample sequence and the emotion direction sample of each emotion sample in the emotion sample sequence by labeling a plurality of consecutive pieces of information with emotions and emotion directions.

Step 506: Generate a plurality of sample tuples based on the emotion sample sequence and the emotion direction sample of each emotion sample.

The emotion processing device may select two adjacent emotion samples from the emotion sample sequence. For example, an emotion sample for an $n^{th}$ round and an emotion sample for an $(n+1)^{th}$ round may be obtained. The emotion processing device may combine the emotion sample for the $n^{th}$ round, the emotion sample for the $(n+1)^{th}$ round, and an emotion direction sample of the emotion sample for the $(n+1)^{th}$ round into a sample tuple, so that the emotion processing device can obtain the plurality of sample tuples. Therefore, each sample tuple may include the emotion sample for the $n^{th}$ round, the emotion sample for the $(n+1)^{th}$ round, and the emotion direction sample of the emotion sample for the $(n+1)^{th}$ round, n being a positive integer, and n+1 being less than or equal to a total quantity of samples in the emotion sample sequence.

Step 507: Collect statistics about a probability of transitioning between two emotion samples for adjacent rounds for the emotion direction sample based on the plurality of sample tuples.

Herein, the emotion transition relationship may be determined from a statistical result based on the historical emotion.

The emotion processing device may collect statistics about the probability of transitioning between the two emotion samples for the adjacent rounds for the emotion direction sample by using the plurality of sample tuples as sample data, and may obtain the probability of transitioning from all emotions for a previous round to all emotions for a next round based on the emotion direction, which may be referred to as the statistical result. Since the historical emotion is known, the emotion processing device may screen the statistical result for a transition relationship based on the historical emotion and the current emotion direction. For example the emotion transition relationship may be obtained. In addition, the statistical result may be represented by using a state machine. The state machine may describe a transformation relationship between different states. Therefore, when the state machine may be used to represent the statistical result, the emotion samples may be used as nodes of the state machine, a probability of transitioning between the emotion samples may be used as an output of a transition arc of the state machine, an emotion direction sample corresponding to a target node of the transition may be an input of the transition arc, and the emotion transition relationship may be represented by using the transition arcs of the state machine.

In one or more examples, to collect statistics about the probability of transitioning between the two emotion samples for the adjacent rounds for the emotion direction samples based on the plurality of sample tuples, the emotion processing device may first collect statistics about a total quantity of transitions corresponding to each emotion for a previous round based on the plurality of sample tuples, then collect statistics about a sub-quantity of transitions of each emotion for the previous round to an emotion for a subsequent round based on each emotion direction sample, and finally determine a ratio of the sub-quantity to the total quantity as the transition probability.

The emotion transition relationship may alternatively be obtained by using a neural network model. In this case, an input of the neural network model is the historical emotion, the current emotion direction, and the candidate emotion, and an output thereof may be the second probability.

Figure 8:
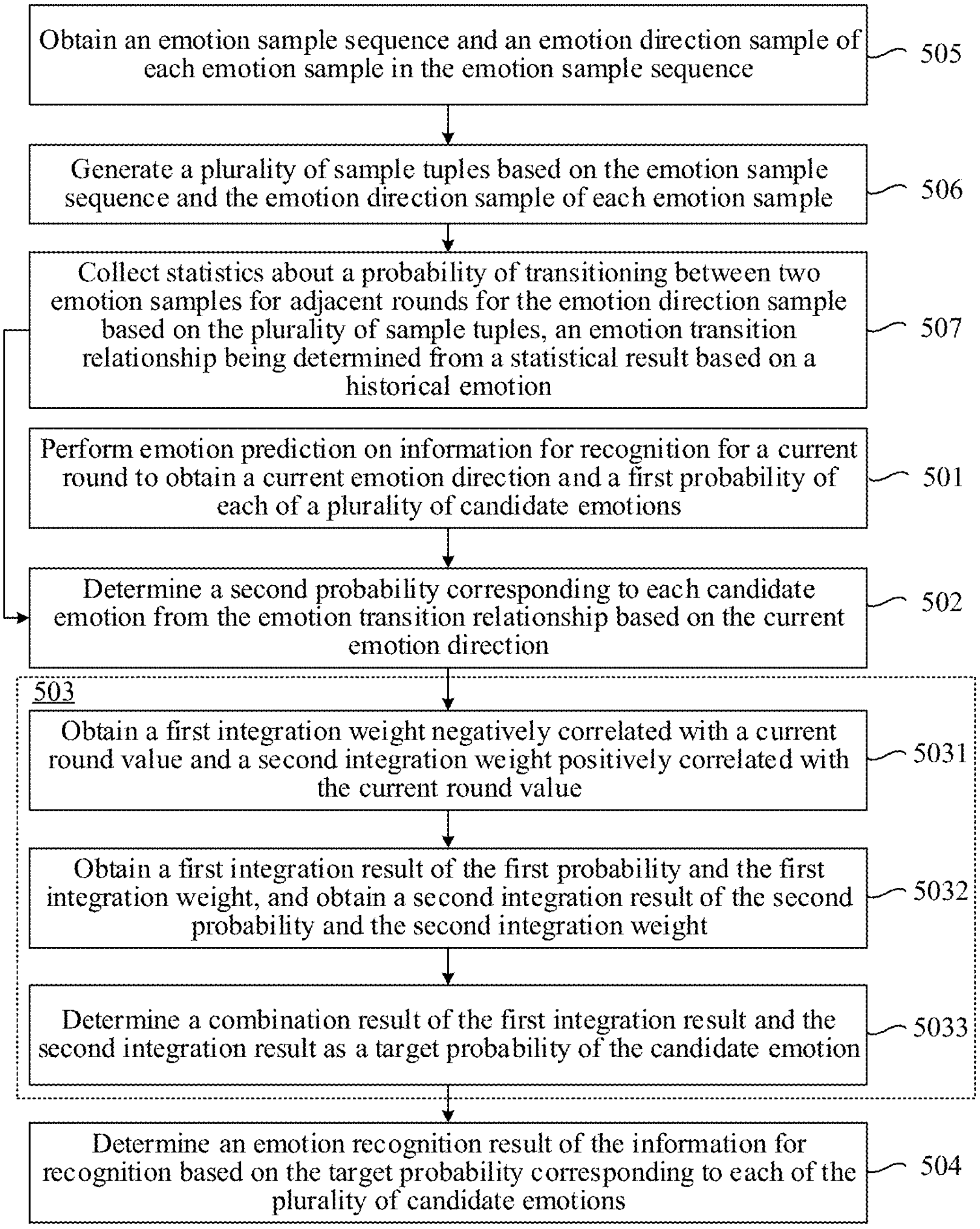
FIG. 8 is a schematic flowchart III of a data processing method according to one or more aspects described herein.

FIG. 8 is a schematic flowchart of an example data processing method. As shown in FIG. 8, step 503 may be implemented by using step S031 to step S033. In other words, the emotion processing device integrating the first probability and the second probability to obtain the target probability of the candidate emotion may include step S031 to step S033. Steps are described below.

Step S031: Obtain a first integration weight negatively correlated with a current round value and a second integration weight positively correlated with the current round value.

During the integration of the first probability and the second probability by the emotion processing device in a manner of weighted summation, the first probability and the second probability may be integrated by using a fixed weight, and the first probability and the second probability may also be integrated based on the current round value by using a dynamic weight, and is not limited to these examples. During integration of the first probability and the second probability by the emotion processing device by using the dynamic weight, the current round value may be determined first, and the integration weight may be dynamically determined based on the current round value. The current round value may represent an order of the current round of emotion prediction process in a plurality of rounds of emotion prediction processes, for example, 1 and 4.

In one or more examples, the first integration weight may be negatively correlated with the current round value, and the second integration weight may be positively correlated with the current round value. Moreover, the first integration weight and the second integration weight may alternatively be in a mutually exclusive relationship. For example, a sum of the first integration weight and the second integration weight is a specified value (for example, the sum of the first integration weight and the second integration weight is 1).

According to one or more aspects, the emotion processing device obtaining the first integration weight negatively correlated with the current round value and the second integration weight positively correlated with the current round value may include: obtaining, by the emotion processing device, a previous first integration weight corresponding to a previous round, and obtaining the first integration weight negatively correlated with the current round value by decreasing the previous first integration weight based on a specified adjustment amplitude; obtaining a previous second integration weight corresponding to the previous round, and obtaining the second integration weight positively correlated with the current round value by increasing the previous second integration weight based on the specified adjustment amplitude. The specified adjustment amplitudes for different prediction rounds may be the same, or may be different, and is not limited. In addition, when the current round is a first round, the previous first integration weight and the previous second integration weight both may be specified weight values.

In some examples, when the current round value is the first round, the first integration weight may be 0.3, and the second integration weight may be 0.7. When the current round value is a second round, the first integration weight may be 0.35, and the second integration weight may be 0.65. When the current round value is a third round, the first integration weight may be 0.38, and the second integration weight may be 0.62. A later round may lead to a greater weight of the second probability and a less weight of the first probability.

Step S032: Obtain a first integration result of the first probability and the first integration weight, and obtain a second integration result of the second probability and the second integration weight.

The emotion processing device may integrate the first probability with the first integration weight to obtain the first integration result. For example, the emotion processing device may determine a product of the first probability and the first integration weight as the first integration result. In addition, the emotion processing device may integrate the second probability with the second integration weight to obtain the second integration result. For example, the emotion processing device may determine a product of the second probability and the second integration weight as the second integration result.

Step S033: Determine a combination result of the first integration result and the second integration result as the target probability of the candidate emotion.

According to some aspects, the emotion processing device may obtain the first integration result and the second integration result, and combine the first integration result and the second integration result. The obtained combination result is the target probability of the candidate emotion. For example, the emotion processing device may determine a sum of the first integration result and the second integration result as the target probability of the candidate emotion.

In some arrangements, when the emotion processing device obtains the second probability, if a plurality of transition paths for the candidate emotion exist, the emotion processing device may integrate a plurality of path probabilities corresponding to the plurality of transition paths into the second probability, and determine a path probability integration weight positively correlated with a probability of the historical emotion in the transition path based on the probability of the historical emotion in the transition paths during the integration. Moreover, the probability of integrating the plurality of path probabilities may also be adjusted based on a quantity of transition paths. For example, an adjustment direction may be positively correlated with the quantity of transition paths. When the quantity is greater than a threshold, the probability of integration may be increased, and when the quantity is less than the threshold, the probability of integration may be decreased. A transition path probability may be a product of all transition probabilities in the transition path.

According to one or more aspects, when the emotion processing device screens the target probabilities corresponding to the plurality of candidate emotions for an emotion recognition result based on at least one of the threshold and the quantity, the determination by the emotion processing device of the emotion recognition result based on the target probability corresponding to each of the plurality of candidate emotions in step 504 may include: arranging, by the emotion processing device, the plurality of candidate emotions in reverse order based on the target probability, to obtain a to-be-screened emotion sequence; screening the to-be-screened emotion sequence for a target emotion sequence based on a specified screening parameter; and finally determining the target emotion sequence and a target probability of each target emotion in the target emotion sequence as the emotion recognition result.

In one example, the specified screening parameter may include at least one of a probability threshold parameter and an emotion quantity parameter, and the specified screening parameter may be at least one of a threshold and a quantity. Herein, when the specified screening parameter includes the probability threshold parameter, the emotion processing device may determine, as the target emotion sequence, all candidate emotions with the target probability being greater than the probability threshold parameter. When the specified screening parameter includes the emotion quantity parameter, the emotion processing device may determine a quantity (which is equal to the emotion quantity parameter) of maximum target probabilities, and combine corresponding candidate emotions into the target emotion sequence. The probability threshold parameter is a specified probability threshold, which represents a minimum probability for screening the candidate emotions, for example, 0.8. The emotion quantity parameter is a specified quantity threshold, which represents a maximum quantity for screening the candidate emotions, for example, 5.

After step 504, a process of determining a subsequent historical emotion by the emotion processing device based on the emotion recognition result may be performed. In other words, after the emotion processing device determines the emotion recognition result based on the target probability corresponding to each of the plurality of candidate emotions, the data processing method may further include: screening, by the emotion processing device based on the target probability, the plurality of candidate emotions arranged in reverse order for a specified quantity of candidate emotions; and determining the specified quantity of candidate emotions as a current candidate emotion sequence, the current candidate emotion sequence being configured to determine a historical emotion for a next round of prediction. In this case, the emotion recognition result may include the plurality of candidate emotions and the target probability corresponding to each candidate emotion.

In some examples, the plurality of candidate emotions arranged in reverse order form the foregoing to-be-screened emotion sequence. Herein, the emotion processing device may use all of the plurality of candidate emotions to determine the historical emotion for the next round of prediction, and may also screen the plurality of candidate emotions for the specified quantity of candidate emotions to determine the historical emotion for the next round of prediction, but is not limited to such examples. In addition, the specified quantity may be the same as or may be different from the emotion quantity parameter, and is also not limited to these examples.

It may be understood that, in the process of determining the historical emotion for the next round of prediction through screening of the plurality of candidate emotions for the specified quantity of candidate emotions by the emotion processing device based on the target probabilities, since the screening is performed in descending order of the target probabilities, a quantity of historical emotions may be reduced while accuracy is ensured or improved. Therefore, an emotion-based data processing amount can be reduced, computing resources required for obtaining the emotion prediction result can be saved, and emotion recognition efficiency can be improved.

In step 501, the emotion prediction on the information for recognition to obtain the current emotion direction may include: performing, by the emotion processing device, the emotion prediction on the information for recognition to obtain a third probability corresponding to each emotion direction; determining an emotion direction with the highest third probability as a benchmark emotion direction; determining, as a to-be-selected emotion direction, the emotion direction with a probability difference between the third probability and a third probability of the benchmark emotion direction less than a probability difference threshold; and finally determining the benchmark emotion direction and the to-be-selected emotion direction as the current emotion direction.

In one or more examples, during prediction of the information for recognition, the emotion processing device may predict the third probability corresponding to each of a plurality of emotion directions. The plurality of emotion directions may be preset, and each emotion direction may correspond to at least one candidate emotion. For example, candidate emotions corresponding to a positive emotion direction may include excitement, cheerfulness, and liking, while candidate emotions corresponding to an empty emotion direction include normal, and candidate emotions corresponding to a negative emotion direction include wrath, disgust, depression, irony, and the like. Next, the emotion processing device may select, based on the third probability, an emotion direction with the highest third probability from the plurality of emotion directions arranged in reverse order, which may be referred to as the benchmark emotion direction, and may directly determine the benchmark emotion direction as the current emotion direction. Alternatively (e.g., instead of determining the benchmark emotion direction as the current emotion direction), the emotion processing device may continue to perform determination on the plurality of emotion directions arranged in reverse order, to determine whether the plurality of emotion directions include an emotion direction with the probability difference between the third probability and the third probability of the benchmark emotion direction less than the probability difference threshold (for example, 0.001), which may be referred to as the to-be-selected emotion direction. In addition, when the determination result is yes, the to-be-selected emotion direction and the benchmark emotion direction may be jointly used as the current emotion direction.

In some examples, the emotion processing device may perform the emotion prediction based on the information for recognition, and the obtained third probability corresponding to each emotion direction may be: positive (0.9), empty (0.01), and negative (0.89). When the probability difference threshold is 0.001, the benchmark emotion direction is positive, and the to-be-selected emotion direction is negative. In this way, the current emotion direction includes positive and negative.

Figure 9:
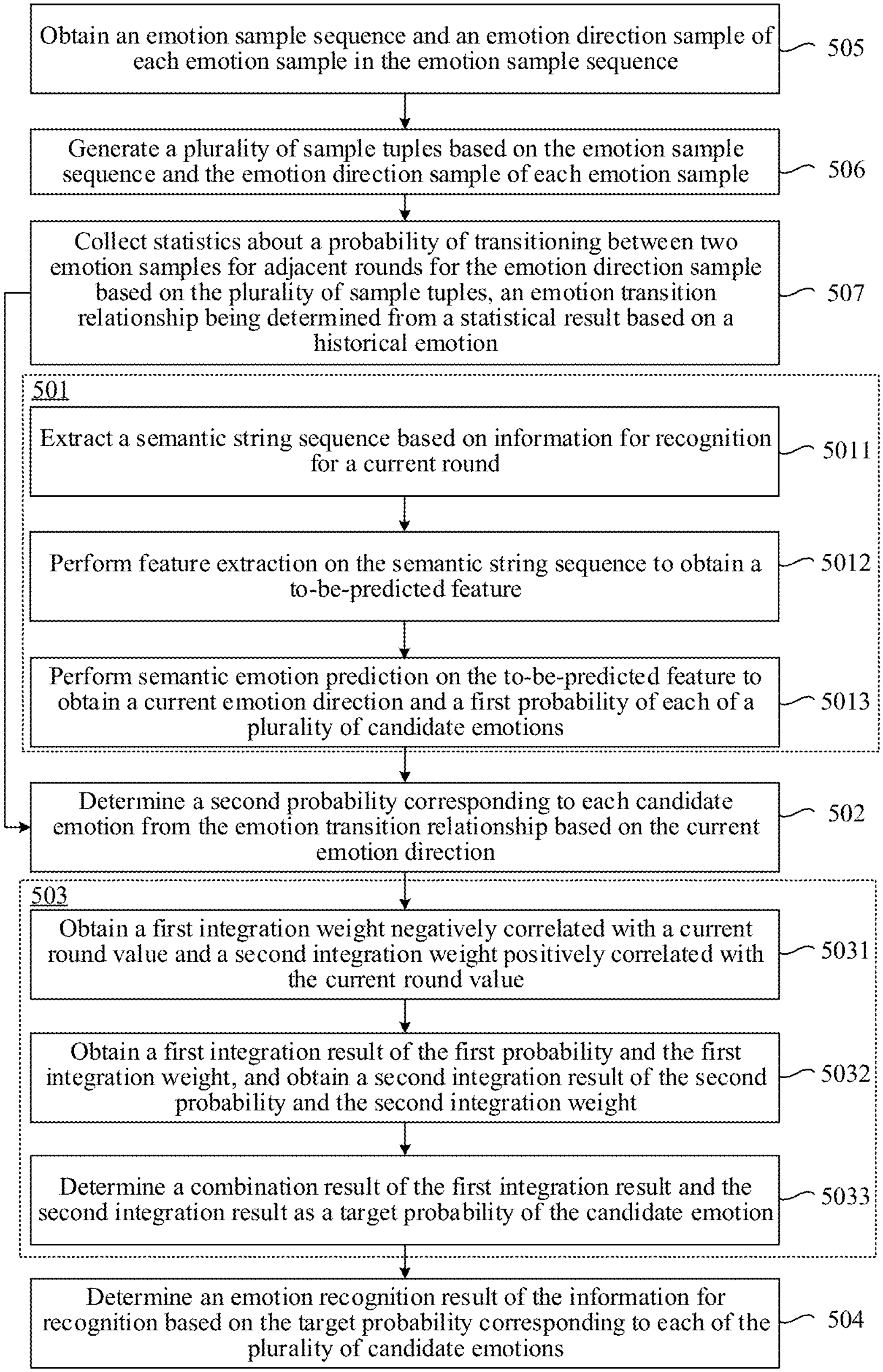
FIG. 9 is a schematic flowchart IV of a data processing method according to one or more aspects described herein.

FIG. 9 is a schematic flowchart of an example data processing method. As shown in FIG. 9, step 501 in FIG. 5 may be implemented by using step S011 to step S013. In other words, the emotion prediction on information for recognition for a current round to obtain a current emotion direction and a first probability of each of a plurality of candidate emotions may include step S011 to step S013. Steps are respectively described below.

Step S011: Extract a semantic string sequence based on the information for recognition for the current round.

The emotion processing device may first perform semantic extraction on the information for recognition when performing the emotion prediction on the information for recognition based on semantics. For example, the semantic string sequence may be extracted. Herein, the emotion processing device may perform the semantic extraction on the information for recognition based on a preset semantic string table, to filter out information such as non-semantic characters and strings. When the information for recognition is information in a text format, the emotion processing device may directly extract semantic strings from the information for recognition, and combine the extracted semantic strings into a voice string sequence. When the information for recognition is to-be-recognized audio, the extraction of the semantic string sequence based on the information for recognition may include: first performing, by the emotion processing device, text recognition on the to-be-recognized audio for the current round, to obtain a to-be-recognized text; then extracting the semantic strings from the to-be-recognized text; and finally combining the semantic strings into the semantic string sequence. Each semantic string in the semantic string sequence may be used for representing emotion semantics.

In some examples, the text recognition may be used for converting information in a non-text form such as audio to information in a text form, which may be implemented by using a preset automatic speech recognition (ASR) system.

Step S012: Perform feature extraction on the semantic string sequence to obtain a to-be-predicted feature.

The emotion processing device may obtain the semantic strings and then perform feature extraction on the semantic strings, thereby obtaining the to-be-predicted feature. For example, the emotion processing device may first perform vector representation on the semantic string sequence, and perform embedded representation on a vector representation result. In this case, the obtained embedded representation result may be the to-be-predicted feature. The feature extraction may include the vector representation and the embedded representation.

Step S013: Perform semantic emotion prediction on the to-be-predicted feature to obtain the current emotion direction and the first probability of each of the plurality of candidate emotions.

The emotion processing device may perform fine-grained semantic emotion prediction based on the to-be-predicted feature, thereby obtaining the first probability of each of the plurality of candidate emotions. The emotion processing devices may perform coarse-grained semantic emotion prediction based on the to-be-predicted feature, and can obtain the current emotion direction. A category granularity of the fine-grained semantic emotion prediction may be finer than a category granularity of the coarse-grained semantic emotion prediction.

According to one or more aspects, through semantic extraction on the information for recognition and the emotion prediction based on the semantic strings, the emotion prediction can be performed on different types of information for recognition, which improves versatility of the data processing methods discussed herein. Through the feature extraction on the semantic string sequence and the emotion prediction based on the obtained to-be-predicted feature, compared with the emotion prediction performed based on raw data, the fine granularity of the emotion prediction can be improved, thereby improving accuracy of the emotion prediction.

Feature extraction and semantic emotion prediction may be implemented by using an emotion prediction model. The emotion prediction model may be obtained through training by using the following steps: obtaining an information recognition sample, and obtaining an emotion label and an emotion direction label corresponding to the information recognition sample; performing emotion prediction on the information recognition sample based on a to-be-trained prediction model, to obtain an emotion prediction probability and an emotion direction prediction probability, the to-be-trained prediction model being a to-be-trained network model for performing the emotion prediction; and training the to-be-trained prediction model based on a difference between the emotion prediction probability and the emotion label and a difference between the emotion direction prediction probability and the emotion direction label, to obtain the emotion prediction model. The emotion prediction model may be configured to perform semantic-based emotion prediction on the information for recognition. A prediction result may include the first probability of the candidate emotion and the third probability of the emotion direction. An actual emotion of the emotion label may be labeling information. The emotion direction label may be an actual emotion direction, and may be labeling information.

According to some arrangements, the emotion processing device may include a to-be-trained prediction model, or the emotion processing device can obtain the to-be-trained prediction model from another device (for example, a pre-training device or a storage device). Therefore, the emotion processing device may obtain the information recognition sample, and then use the information recognition sample to perform model training on the to-be-trained prediction model. During the model training, the emotion processing device may combine the difference between the emotion prediction probability and the emotion label and the difference between the emotion direction prediction probability and the emotion direction label to obtain a loss function value during the model training, then perform backpropagation in the to-be-trained prediction model based on the loss function value to adjust a parameter in the to-be-trained prediction model, and then implement the training of the to-be-trained prediction model.

In one or more examples, the training of the to-be-trained prediction model may be performed iteratively. When a training end condition is satisfied, the training may be ended, and the emotion prediction model may be obtained. Herein, the training end condition may be reaching an accuracy index threshold, reaching a threshold of a number of training times, reaching a training duration threshold, a combination of the above, or the like, and is not limited to such examples.

After step 504, a process of application based on the emotion recognition result may be further included. For example, the emotion recognition result may be applied to expression rendering of a virtual object, and may also be applied to information detection of an interactive message.

When the emotion processing device applies the emotion recognition result to the expression rendering of the virtual object, the information for recognition may be to-be-played audio of a to-be-presented virtual object. In this case, the emotion processing device may generate expression rendering data of the to-be-presented virtual object based on the emotion recognition result, and render an expression of the to-be-presented virtual object based on the expression rendering data during playback of the to-be-played audio.

In some examples, the expression rendering data may be an expression value determined based on the target probability of the candidate emotion in the emotion recognition result. After obtaining the expression rendering data, the emotion processing device may render an expression of the virtual object based on the expression rendering data during the playback of the to-be-played audio, to implement synchronization between the audio playback and the expression of the virtual object.

According to some aspects, when the emotion processing device applies the emotion recognition result to the information detection of the interactive message, the information for recognition may be the interactive message. In this case, the emotion processing device may determine an interactive emotion state based on the emotion recognition result. When the interactive emotion state is in a to-be-reviewed emotion state, prompt information may be displayed. The prompt information may be used for prompting to change the interactive emotion state. However, when the interactive emotion state is a preset normal state, no prompt information might be displayed.

In one or more arrangements, the emotion processing device can be widely applied to various emotion recognition scenarios such as a cloud technology, AI, intelligent transportation, a game, and a vehicle, perform an emotion prediction process on different kinds of information for recognition, and perform a related service based on an emotion prediction result. Through combination of a probability obtained through the current round of emotion prediction process with a probability obtained through a historical emotion prediction process, accuracy of a plurality of rounds of consecutive emotion prediction may be improved while ensuring accuracy of an emotion prediction result for a single round.

One example application scenario is described below. The example application describes a process of generating a virtual human (which may be referred to as the to-be-presented virtual object) face expression through emotion recognition.

Figure 10:
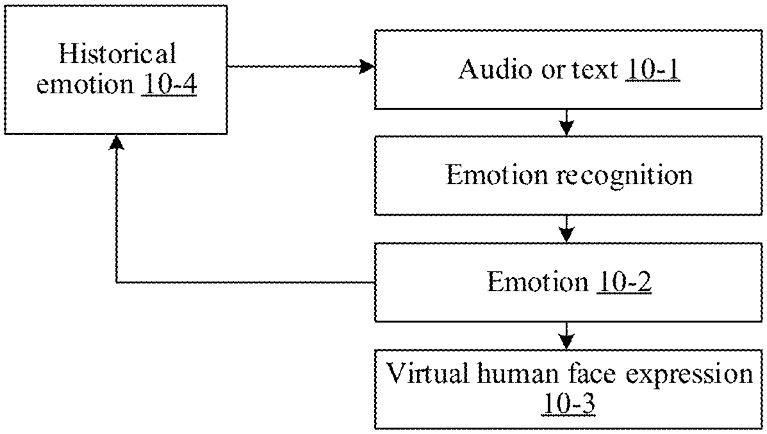
FIG. 10 is a flowchart of exemplary application of emotion recognition according to an embodiment of this application.

FIG. 10 is a flowchart of an example application of emotion recognition. As shown in FIG. 10, in the example application process of the emotion recognition, inputted audio or an inputted text 10-1 (which is referred to as information for recognition) is first received. Next, the emotion recognition is performed on the audio or text 10-1 based on a historical emotion 10-4 to obtain an emotion 10-2 (which is referred to as an emotion recognition result). Finally, a virtual human face expression 10-3 is determined based on the emotion 10-2, and the emotion 10-2 is updated to the historical emotion 10-4.

Figure 11:
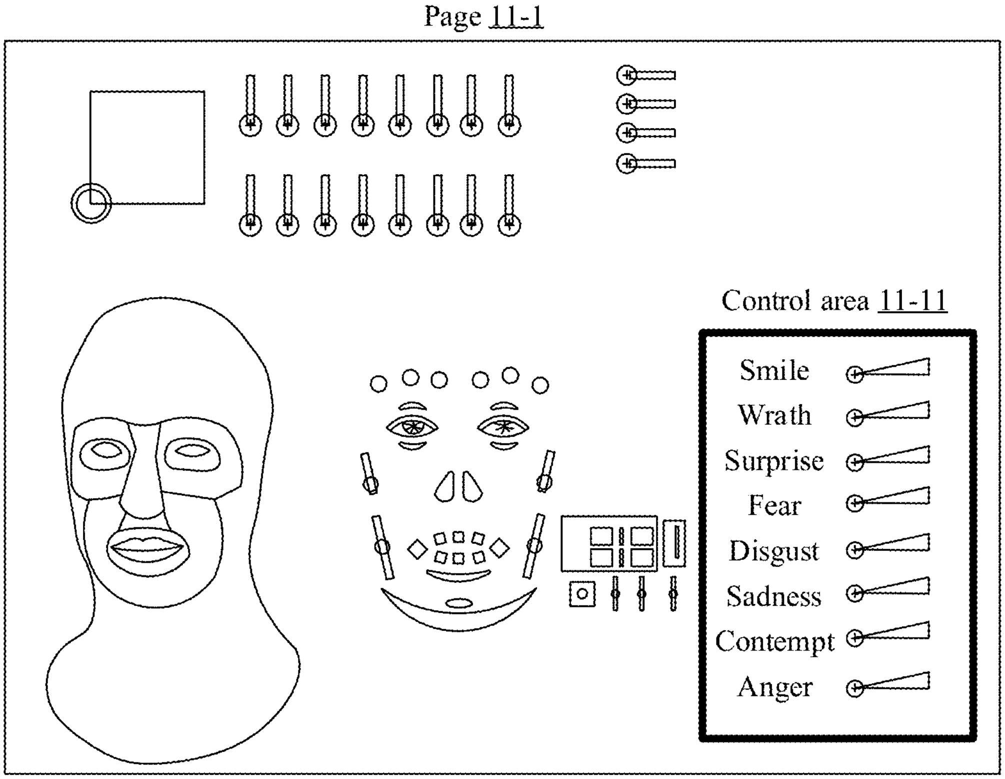
FIG. 11 is a schematic diagram of exemplary generation of a virtual human face expression according to one or more aspects described herein.

For the description of determining the virtual human face expression 10-3 based on the emotion 10-2, reference is made to FIG. 11. FIG. 11 is a schematic diagram of an example process for generating a virtual human face expression. As shown in FIG. 11, a value of each control is adjusted in a control area 11-11 of a page 11-1 by using the emotion 10-2 in FIG. 10, thereby completing the generation of the virtual human face expression.

The following description uses an example in which the received information for recognition is audio (which is also referred to as current audio) for describing an example process of emotion recognition.

Figure 12:
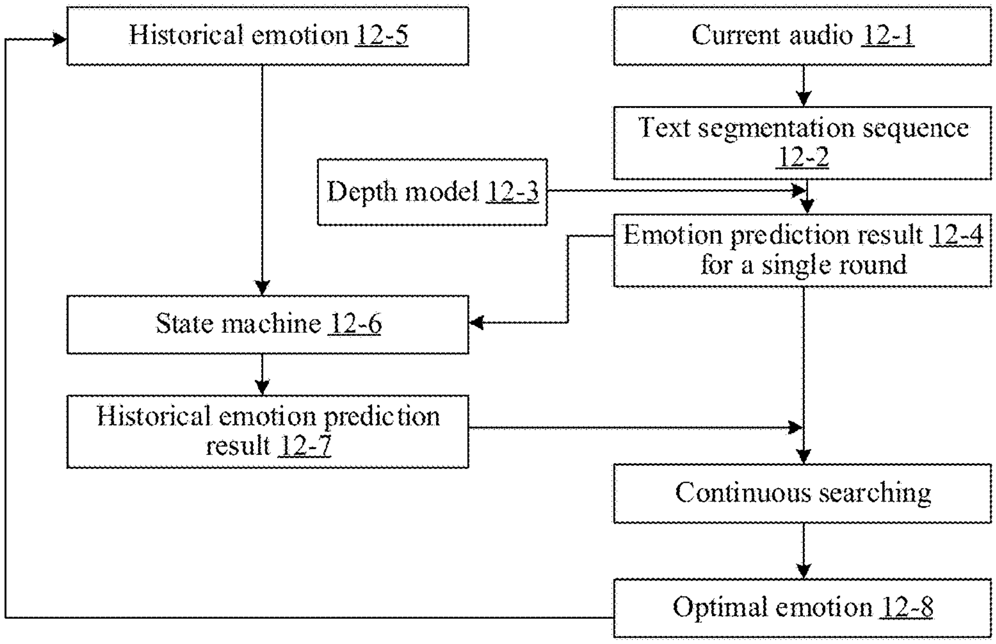
FIG. 12 is a flowchart of exemplary emotion recognition according to one or more aspects described herein.

FIG. 12 is a flowchart of an example emotion recognition process. As shown in FIG. 12, in the exemplary emotion recognition process, text processing is performed on current audio 12-1 to obtain a text tokenization sequence 12-2 (which is referred to as a semantic string sequence). Next, a single round of emotion prediction is performed on the text tokenization sequence 12-2 by using a depth model 12-3 (which is referred to as an emotion prediction model), to obtain an emotion prediction result 12-4 (which is referred to as a current emotion direction and a first probability corresponding to each candidate emotion) for the single round. Next, a plurality of rounds of emotion prediction are performed based on an obtained historical emotion 12-5, a state machine 12-6, and the emotion prediction result 12-4 for the single round, to obtain a historical emotion prediction result 12-7. Next, the historical emotion prediction result 12-7 and the emotion prediction result 12-4 for the single round are continuously searched to obtain an optimal emotion 12-8. The optimal emotion 12-8 is the emotion 10-2 in FIG. 10.

In this example, during the text processing of the current audio 12-1, since the current audio 12-1 is in the form of audio, the text processing may include converting audio to a text and preprocessing. The preprocessing may include tokenization and serialization. The converting the audio to the text may include performing text recognition on the current audio 12-1 through ASR (a technology that converts speech into text) to obtain a text corresponding to the current audio 12-1. Tokenization may refer to tokenizing a text by using a preset semantic word table (referred to as a semantic string table) to remove characters (including non-semantic pause words) that are not within the semantic word table. The serialization may be a process of converting a tokenization result to the text tokenization sequence 12-2.

Content of the emotion prediction result 12-4 for the single round may include two parts: a probability distribution corresponding to explicit emotion states (which are referred to as a plurality of candidate emotions) and a probability distribution corresponding to implicit emotion states (which are referred to as a plurality of emotion directions). The explicit emotion states may represent clear categories of emotions, and the implicit emotion states may represent emotion change directions, for example, as shown in Table 1.

TABLE 1

| Name | Description |
|---|---|
| Explicit emotion state | Normal, wrath, disgust, depression, excitement, joy, and surprise |
| Implicit emotion state | Normal, positive, and negative |

The depth model 12-3 may include an embedding layer, an encoding layer, an explicit multilayer perceptron (MLP) layer, and an implicit MLP layer. Corresponding input features and output features are shown in Table 2.

TABLE 2

| Model layer | Input feature | Output feature |
|---|---|---|
| Embedding layer | Text tokenization sequence | Semantic vector sequence |
| Encoding layer | Semantic vector sequence | Vector of feature extraction |
| Explicit MLP layer | Vector of feature extraction | Explicit emotion prediction distribution |
| Implicit MLP layer | Vector of feature extraction | Implicit emotion prediction distribution |

Figure 13:
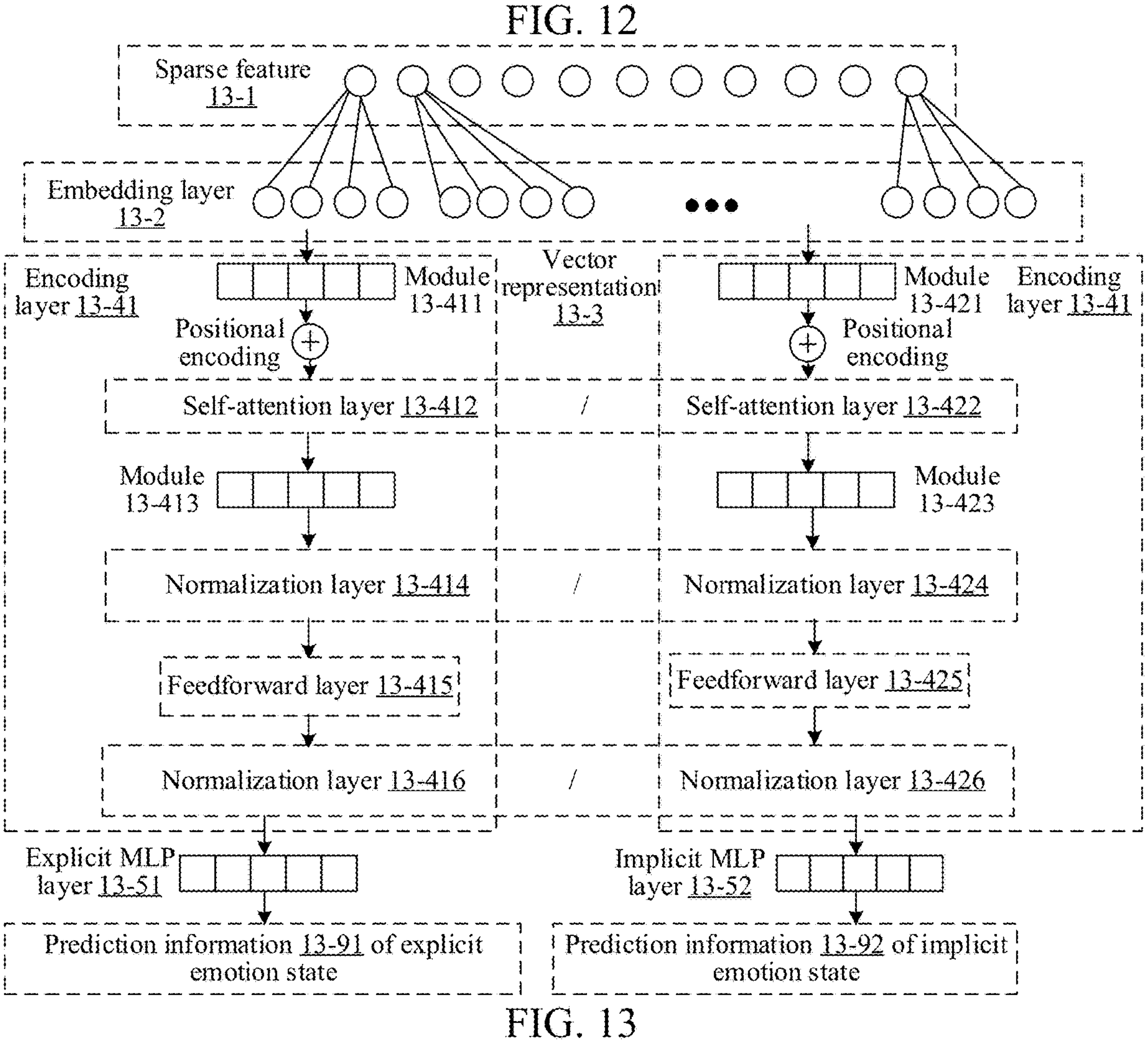
FIG. 13 is a schematic structural diagram of an exemplary depth model according to one or more aspects described herein.

FIG. 13 is a schematic structural diagram of an example depth model. As shown in FIG. 13, sparse features 13-1 form a text tokenization sequence. After the sparse features 13-1 pass through an embedding layer 13-2, a vector representation 13-3 is obtained. Then in a branch, after the vector representation 13-3 successively passes through an encoding layer 13-41 and an explicit MLP layer 13-51 (an output layer, for example, a Softmax layer), predictive information 13-91 (which is referred to as a probability distribution) of an explicit emotion state is obtained. In another branch, after the vector representation 13-3 successively passes through an encoding layer 13-42 and an implicit MLP layer 13-52, predictive information 13-92 (which is referred to as a probability distribution) of an implicit emotion state is obtained. The encoding layer 13-41 includes a module 13-411, a self-attention layer 13-412, a module 13-413, a normalization layer (layer norm) 13-414, a feedforward layer 13-415, and a normalization layer 13-416. The encoding layer 13-42 includes a module 13-421, a self-attention layer 13-422, a module 13-423, a normalization layer 13-424, a feedforward layer 13-425, and a normalization layer 13-426. In addition, output results of the module 13-411 and the module 13-421 are respectively used for being combined with positional encoding. The self-attention layer 13-412 and the self-attention layer 13-422 may be the same module, the normalization layer 13-414 and the normalization layer 13-424 may be the same module, and the normalization layer 13-416 and the normalization layer 13-426 may share model parameters.

Therefore, the process of obtaining the emotion prediction result 12-4 for the single round is shown in Table 3.

TABLE 3

| Name | Description |
|---|---|
| Input | Text tokenization sequence |
| Output | Probability distribution of explicit emotion states<br>Probability distribution of implicit emotion states |

Next, a plurality of rounds of emotion prediction processes are described.

In one or more arrangements, the plurality of rounds of emotion prediction are implemented by using a sequence prediction model. The sequence prediction model may be configured to predict a probability distribution of $S_n+h_{n+1}\rightarrow S_{n+1}$, where S represents explicit emotions, h represents implicit emotions, n represents a previous round, and n+1 represents the current round, which may be described by using Formula (1). Formula (1) is as follows:

$$P(S_{n+1}|S_{n+1}\in S)=P\_\text{trans}(S_n,h_{n+1}|S_n\in S,h_{n+1}\in h) \quad (1)$$

where $P(S_{n+1}|S_{n+1}\in S)=P\_\text{trans}(S_n, h_{n+1}|S_n\in S,h_{n+1}\in h)$ represents a probability of an explicit emotion state $S_{n+1}$ predicted based on $S_n$, $h_{n+1}$ (which is referred to as a second probability). For example, when $S_n$ is "normal" and $h_{n+1}$ is "positive", a probability of predicting that $S_{n+1}$ is "excitement" is 0.9, a probability of predicting that $S_{n+1}$ is "cheerfulness" is 0.8, and a probability of predicting that $S_{n+1}$ is "sadness" is 0.02.

For a trained sequence prediction model with explicit emotion states and implicit emotion states, the state machine may be obtained by using the explicit emotion state as a node, the implicit emotion state as an input of a transition arc, and the predicted probability as an output of the transition arc.

Figure 14:
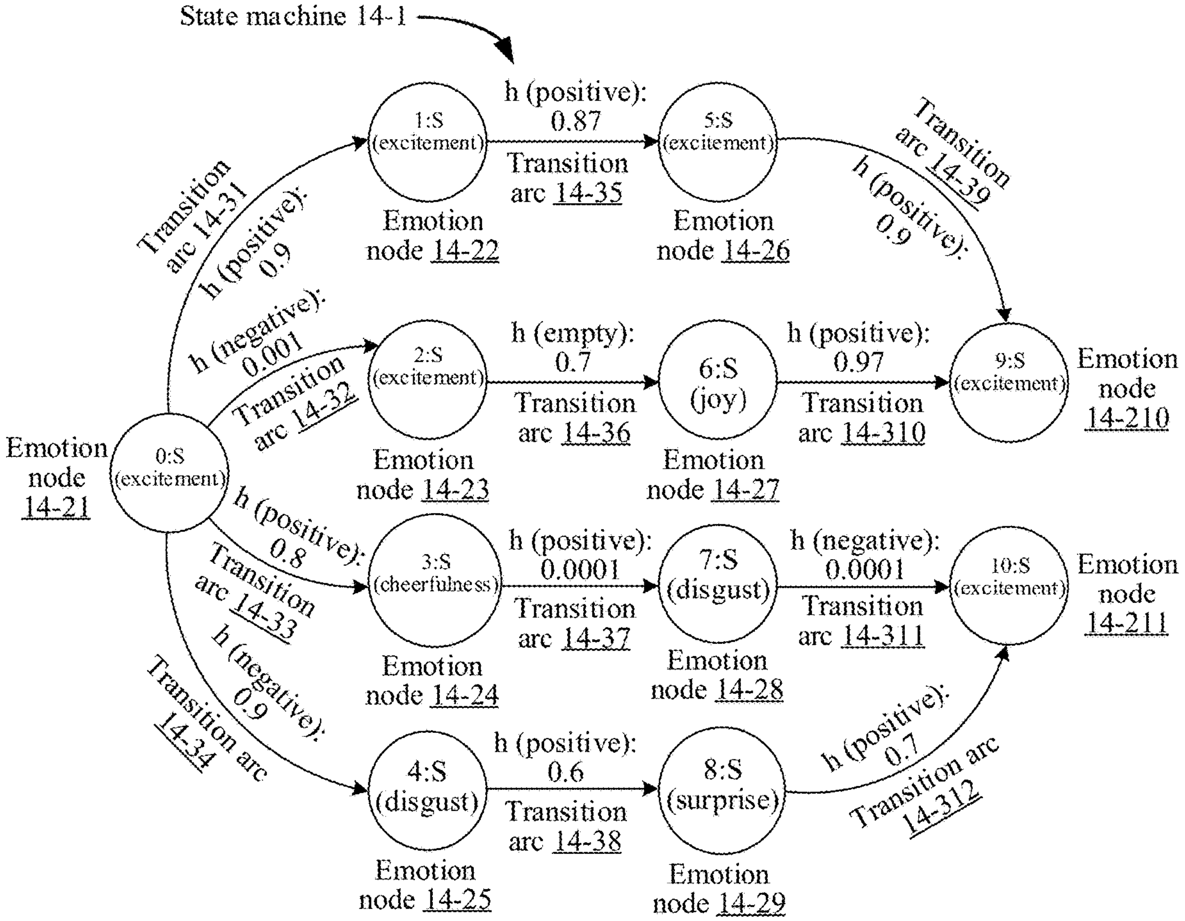
FIG. 14 is a schematic diagram of an exemplary state machine according to one or more aspects described herein.

FIG. 14 is a schematic diagram of an example state machine according to an embodiment of this application. FIG. 14 shows a state machine 14-1. The state machine 14-1 includes 11 emotion nodes (an emotion node 14-21 to an emotion node 14-211) and 12 transition arcs (a transition arc 14-31 to a transition arc 14-312). The emotion node 14-21 and the transition arc 14-31 are used as examples for description herein. The emotion node 14-21 represents a starting emotion node, and an explicit emotion state S represented is excitement. The transition arc 14-31 represents that a probability of transitioning from the emotion node 14-21 to the emotion node 14-22 is 0.9 when an emotion direction h is positive.

In one or more examples, in the state machine, the explicit emotion states may be the nodes, the implicit emotion states may be inputs of the transition arcs, and predicted probabilities may be outputs of the transition arcs. In addition, in the state machine, for any node $S_n$, the transition arcs with the node $S_n$ as a start point are traversed. When a transition arc arrives at a node $S_{n+1}$, an input corresponding to the transition arc is $h_{n+1}$, and an output is a probability $w_{n+1}$. Therefore, at least one sequence prediction result can be obtained based on the node $S_n$ and the input $h_{n+1}$ of the transition arc for a previous round. The at least one sequence prediction result is, for example, shown in Formula (2).

$$S(\text{Normal})+h(\text{Positive})\rightarrow[S(\text{Excitement}):0.9, S(\text{Cheerfulness}):0.8, S(\text{Sadness}):0.02, \ldots] \quad (2).$$

At this point, an emotion prediction result 9-4 for a single round and the at least one sequence prediction result may be obtained. Herein, the emotion prediction result 9-4 for the single round may be combined with the at least one sequence prediction result in a continuous sequence prediction manner (for example, a beam search algorithm), to calculate an optimal prediction result.

An example implementation process of the continuous sequence prediction manner is shown in Table 4.

TABLE 4

| Name | Step |
|---|---|
| Beam search algorithm | Input explicit emotion states corresponding to historical emotions into a stack<br>Use the explicit emotion states predicted by a depth model as to-be-transitioned states<br>Traverse transition paths from the historical emotions in the stack to the to-be-transitioned states based on a transition relationship obtained by a state machine, to determine combined scores (which is referred to as a target probability) of the to-be-transitioned states based on a probability value of the depth model and a probability value of transition<br>Sort the to-be-transitioned states in reverse order based on the combined scores and trim off the explicit emotion states with combined scores not meeting a requirement<br>Use the explicit emotion state with the highest combined score as a current optimal state prediction result |

Figure 15:
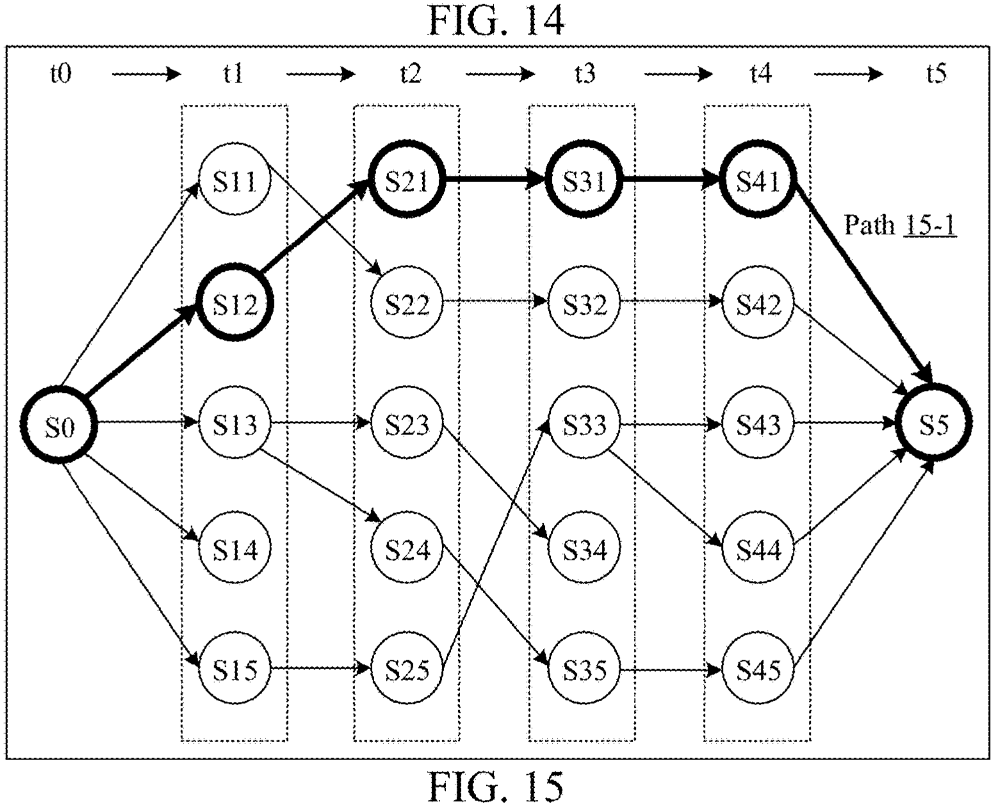
FIG. 15 is a schematic diagram of exemplary determination of a final result according to one or more aspects described herein.

FIG. 15 is a schematic diagram of an example process for determining a final result. As shown in FIG. 15, a process of determining an optimal emotion corresponding to a current round in rounds t0-t5 of prediction is described. In the round t1 of prediction, a final probability (which is referred to as the target probability) of each explicit emotion state may be comprehensively calculated based on a transition probability of an explicit emotion state S0 to each explicit emotion state (S11 to S15 in the stack) for the round t1, and a probability of each explicit emotion state predicted by a depth model. Then an emotion recognition result for the round t1 may be determined based on the final probability. For example, the optimal emotion may be the explicit emotion state S11. In the round t2 of prediction, a final probability of each explicit emotion state may be comprehensively calculated based on a transition probability of the explicit emotion states S11 to S15 to each explicit emotion state (S21 to S25 in the stack) for the round t2, and the probability of each explicit emotion state predicted by the depth model. Then an emotion recognition result for the round t2 may be determined based on the final probability. For example, the optimal emotion may be the explicit emotion state S21. In this case, since S21 may be generated from a transition from S12, the optimal emotion from the round t1 may be revised as the explicit emotion state S11. By analogy, it is predicted that an optimal emotion for a round t3 is an explicit emotion state S31, an optimal emotion for a round t4 is an explicit emotion state S41, and an optimal emotion for a round t5 is an explicit emotion state S5. Therefore, an optimal emotion transition relationship as shown by a path 15-1 is obtained.

Another actual application scenario is described below. The exemplary application describes a process of detecting emotions of a player in a game scene through emotion recognition.

Figure 16:
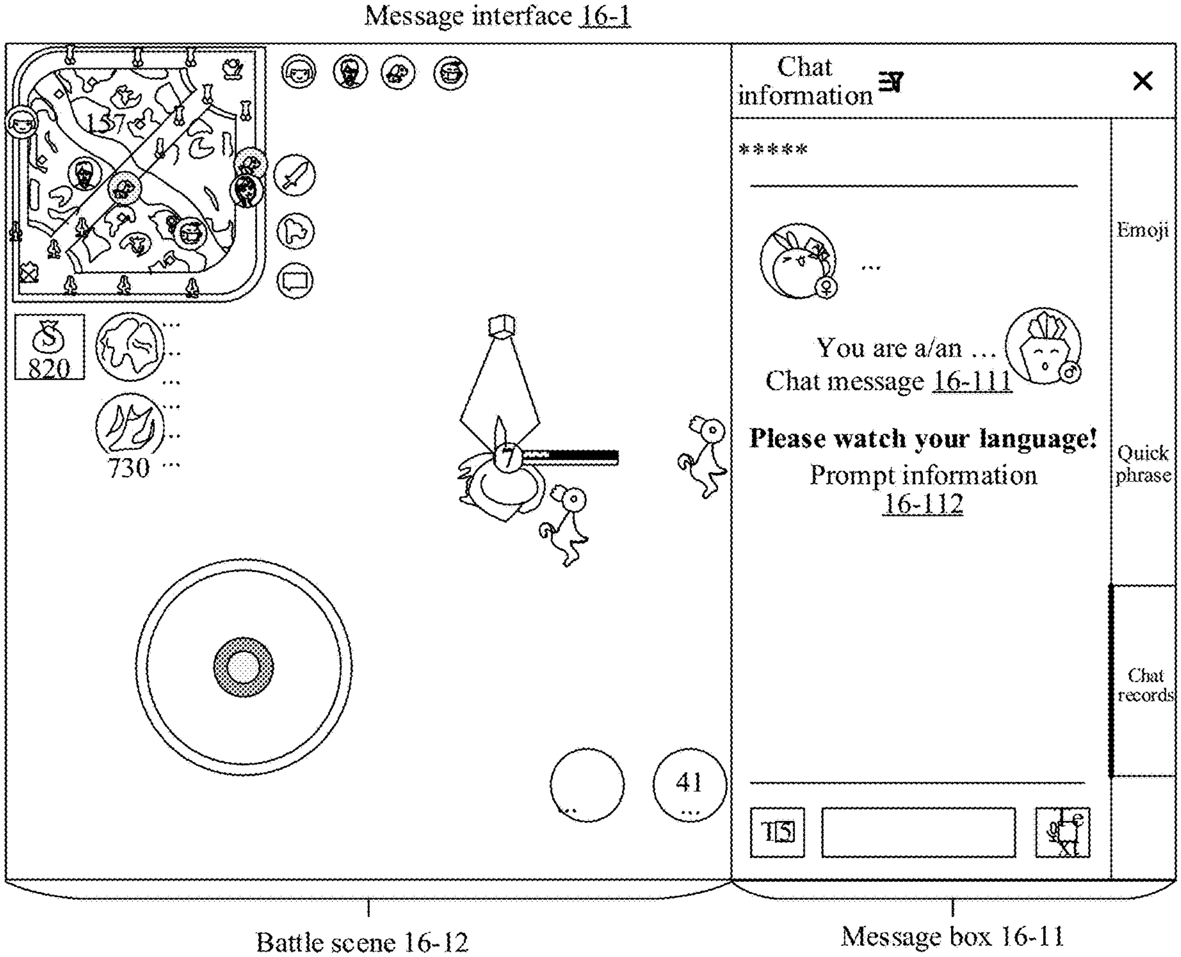
FIG. 16 is a schematic diagram of an exemplary emotion recognition interface according to one or more aspects described herein.

FIG. 16 is a schematic diagram of an example emotion recognition interface. As shown in FIG. 16, a message interface 16-1 describes a chat scene within a game battle, including a message box 16-11 and a battle scene 16-12. When a chat message (which is referred to as an interactive message) 16-111 ("You are a/an . . . ") is obtained through a message input box in the message box 16-11, emotion recognition is performed on the chat message 16-111 by using the data processing method provided in the embodiments of this application. When it is determined that a recognition result represents that a current emotion of the player is a preset emotion (for example, an emotion such as wrath that triggers public opinion), it is also determined that the current emotion state of the player is a to-be-reviewed emotion state, so that prompt information 16-112 ("Please watch your language!") is displayed, to relieve the current emotion of the player. The process of performing the emotion recognition on the chat message 16-111 by using the data processing method provided in the embodiments of this application is similar to the descriptions corresponding to FIG. 12 to FIG. 15. Details are not described herein again in this embodiment of this application.

In one or more arrangements the prediction of the explicit emotion states and the implicit emotion states is implemented, and the implicit emotion states may be combined with the state machine to implement the process of comprehensively predicting the current optimal emotion state based on the historical emotion states, which improves accuracy of the emotion prediction, and implements smoothness and continuity of the emotion prediction.

The following continues to describe an example structure of the data processing apparatus 455. In some arrangements, as shown in FIG. 4, the software module stored in the data processing apparatus 455 in the memory 450 may include:

an emotion prediction module 4551, configured to perform emotion prediction on information for recognition for a current round to obtain a current emotion direction and a first probability of each of a plurality of candidate emotions, the current emotion direction being a direction of an emotion of the information for recognition, and the candidate emotion being a preset emotion type;

a transition prediction module 4552, configured to determine a second probability corresponding to each candidate emotion from an emotion transition relationship based on the current emotion direction, the emotion transition relationship representing a probability of transitioning from a historical emotion to the candidate emotion based on an emotion direction, the historical emotion being an emotion predicted through an emotion prediction process before the current round;

a probability integration module 4553, configured to integrate the first probability and the second probability to obtain a target probability of the candidate emotion; and a result determination module 4554, configured to determine an emotion recognition result of the information for recognition based on the target probability corresponding to each of the plurality of candidate emotions.

In one or more examples, the data processing apparatus 455 may further include a relationship obtaining module 4555, configured to: obtain a plurality of emotion sample sequences and an emotion direction sample of each emotion sample among the emotion sample sequences, each of the emotion sample sequences being N labeled round-consecutive emotion samples, N being a positive integer; generate a plurality of sample tuple sequences based on the plurality of emotion sample sequences and the emotion direction sample of each emotion sample, each of the sample tuple sequences including a plurality of sample tuples, each of the sample tuples including an emotion sample for an $n^{th}$ round, an emotion sample for an $(n+1)^{th}$ round, and an emotion direction sample of the emotion sample for the $(n+1)^{th}$ round, n+1 being less than or equal to a total quantity of samples of the emotion sample sequence; and collect statistics about a probability of transitioning between two emotion samples for adjacent rounds for the emotion direction sample based on the plurality of sample tuple sequences, the emotion transition relationship being determined from a statistical result based on the historical emotion.

The probability integration module 4553 may be further configured to: obtain a first integration weight negatively correlated with a current round value and a second integration weight positively correlated with the current round value, the current round value representing an order of a current round of emotion prediction process in a plurality of rounds of emotion prediction processes; obtain a first integration result of the first probability and the first integration weight; obtain a second integration result of the second probability and the second integration weight; and determine a combination result of the first integration result and the second integration result as the target probability of the candidate emotion.

The result determination module 4554 may be further configured to: arrange the plurality of candidate emotions in reverse order based on the target probability to obtain a to-be-screened emotion sequence; screen the to-be-screened emotion sequence for a target emotion sequence based on a specified screening parameter, the specified screening parameter including at least one of a probability threshold parameter and an emotion quantity parameter; and determine the target emotion sequence and a target probability of each target emotion in the target emotion sequence as the emotion recognition result.

The result determination module 4554 may be further configured to: screen, based on the target probability, the plurality of candidate emotions arranged in reverse order for a specified quantity of candidate emotions; and determine the specified quantity of candidate emotions as a current candidate emotion sequence, the current candidate emotion sequence being configured to determine the historical emotion for a next round of prediction.

The emotion prediction module 4551 may be further configured to: perform the emotion prediction on the information for recognition for the current round to obtain a third probability corresponding to each emotion direction; determine an emotion direction with the highest third probability as a benchmark emotion direction; determine, as a to-be-selected emotion direction, the emotion direction with a probability difference between the third probability and a third benchmark probability less than a probability difference threshold, the third benchmark probability being the third probability of the benchmark emotion direction; and determine the benchmark emotion direction and the to-be-selected emotion direction as the current emotion direction.

The emotion prediction module 4551 is further configured to: extract a semantic string sequence based on the information for recognition for the current round, each semantic string in the semantic string sequence being used for representing emotion semantics; perform feature extraction on the semantic string sequence to obtain a to-be-predicted feature; and perform semantic emotion prediction on the to-be-predicted feature to obtain the current emotion direction and the first probability of each of the plurality of candidate emotions.

According to one or more arrangements, the feature extraction and the semantic emotion prediction may be implemented by using an emotion prediction model. The emotion prediction model may be obtained through training by using the following steps: obtaining an information recognition sample, and obtaining an emotion label and an emotion direction label corresponding to the information recognition sample; performing emotion prediction on the information recognition sample based on a to-be-trained prediction model, to obtain an emotion prediction probability and an emotion direction prediction probability, the to-be-trained prediction model being a to-be-trained network model for performing the emotion prediction; and training the to-be-trained prediction model based on a difference between the emotion prediction probability and the emotion label and a difference between the emotion direction prediction probability and the emotion direction label, to obtain the emotion prediction model.

The emotion prediction module 4551 may be further configured to: perform text recognition on the to-be-recognized audio for the current round to obtain a to-be-recognized text; extract the semantic strings from the to-be-recognized text; and combine the semantic strings to obtain the semantic string sequence.

The data processing apparatus 455 may further include an emotion application module 4556, configured to: generate, in a case that the information for recognition is to-be-played audio of a to-be-presented virtual object, expression rendering data of the to-be-presented virtual object based on the emotion recognition result; and render an expression of the to-be-presented virtual object based on the expression rendering data during playback of the to-be-played audio.

In this embodiment of this application, the emotion application module 4556 is further configured to: determine an interactive emotion state based on the emotion recognition result in a case that the information for recognition is an interactive message; and display prompt information in a case that the interactive emotion state is a to-be-reviewed emotion state, the prompt information being used for prompting to change the interactive emotion state.

One or more aspects also provide a computer program product, the computer program product including a computer program or a computer-executable instruction, the computer program or the computer-executable instruction being stored in a computer-readable storage medium. A processor of an emotion processing device reads the computer-executable instruction from the computer-readable storage medium. The processor executes the computer-executable instruction, so that the emotion processing device performs the foregoing data processing method in the embodiments of this application.

One or more arrangements further include a computer-readable storage medium, having a computer-executable instruction stored therein, the computer-executable instruction, when executed by a processor, causing the processor to perform the data processing method provided in the embodiments of this application, for example, the data processing method shown in FIG. 5.

In some embodiments, the computer-readable storage medium may be a memory such as a FRAM, a ROM, a PROM, an EPROM, an EEPROM, a flash memory, a magnetic surface memory, an optical disk, or a CD-ROM, or may be various devices including one or any combination of the foregoing memories.

In some embodiments, the computer-executable instruction may be written in any form of a programming language (including a compiled or interpreted language, or a declarative or procedural language) in the form of a program, software, a software module, a script, or code, and may be deployed in any form, which may be deployed as a standalone program or as a module, components, a subroutine, or other units suitable for use in a computing environment.

In an example, the computer-executable instruction may but may not necessarily correspond to a file in a file system, may be stored in a part of the file for storing other programs or data, for example, stored in one or more scripts in a hypertext markup language (HTML) document, stored in a single file specially used for the discussed program, or stored in a plurality of collaborative files (for example, files storing one or more modules, a subprogram, or a code part).

In an example, the computer-executable instruction may be deployed on one electronic device for execution (in this case, the electronic device is an emotion processing device), executed on a plurality of electronic devices located at a location (in this case, the plurality of electronic devices located at the location are the emotion processing devices), or executed on a plurality of computer devices distributed at a plurality of locations and interconnected through a communication network (in this case, the plurality of computer devices distributed at the plurality of locations and interconnected through the communication network are the emotion processing devices).

Aspects described herein may relate to related data such as interactive information. User permission or consent needs to be obtained when applied to specific products or technologies, and the collection, use, and processing of related data need to comply with relevant laws, regulations, and standards of relevant countries and regions.

Based on the above, during the emotion prediction, the first probability corresponding to each candidate emotion for a single round and a direction of a current emotion may be first predicted by using current information for recognition. Next, the second probability of transitioning from the historical emotion to the candidate emotion may be determined based on the direction of the current emotion. Finally, through integration of the first probability and the second probability into the target probability of the candidate emotion, a final emotion recognition result may be obtained, so that the emotion recognition result is not only based on a prediction result of the single round, but also combined with the probability of transitioning from the historical emotion to the candidate emotion. Therefore, the data used in obtaining the emotion recognition result may be diverse in time and space. Therefore, the accuracy of emotion recognition can be improved.

The foregoing descriptions are merely examples and are not intended to limit the scope of this disclosure. Any modification, equivalent replacement, and improvement made within the spirit and scope of this disclosure.

What is claimed is:

1. A data processing method, performed by an electronic device, the method comprising:

obtaining, by the electronic device configured to analyze emotion and to generate expression rendering data for generating an expression of a virtual object on a user computer, digital audio data to be analyzed for emotion recognition;

performing, by the electronic device using a emotion prediction model, emotion prediction on information for recognition, including the obtained digital audio data, for a current round to obtain a current emotion direction and a first probability of each of a plurality of candidate emotions represented in the digital audio data, the current emotion direction being a direction of an emotion of the information for recognition, and each of the candidate emotions being a preset emotion type;

determining, by the electronic device, a second probability corresponding to each candidate emotion from an emotion transition relationship based on the current emotion direction, the emotion transition relationship representing a probability of transitioning from a historical emotion to each candidate emotion based on an emotion direction, the historical emotion being an emotion predicted through an emotion prediction process performed before the current round;

integrating, by the electronic device, the first probability and the second probability to obtain a target probability of each candidate emotion, the integrating including:

obtaining a first integration weight negatively correlated with a current round value and a second integration weight positively correlated with the current round value, the current round value representing an order of the current round of emotion prediction process in a plurality of rounds of emotion prediction processes;

obtaining a first integration result of the first probability and the first integration weight;

obtaining a second integration result of the second probability and the second integration weight; and determining a combination result of the first integration result and the second integration result as the target probability of the candidate emotion;

determining an emotion recognition result of the information for recognition based on the target probability corresponding to each of the plurality of candidate emotions;

generating, by the electronic device, the expression rendering data based on the determined emotion recognition result, the expression rendering data configured to cause the user computer to render the expression of the virtual object; and transmitting the expression rendering data to the user computer.

2. The method according to claim 1, wherein, before the determining a second probability corresponding to each candidate emotion from an emotion transition relationship based on the current emotion direction, the method further comprises:

obtaining a plurality of emotion sample sequences and an emotion direction sample of each emotion sample among the emotion sample sequences, each of the emotion sample sequences being N labeled round-consecutive emotion samples, N being a positive integer;

generating a plurality of sample tuple sequences based on the plurality of emotion sample sequences and the emotion direction sample of each emotion sample, each of the sample tuple sequences comprising a plurality of sample tuples, the sample tuples comprising the emotion sample for an $n^{th}$ round, the emotion sample for an $(n+1)^{th}$ round, and the emotion direction sample of the emotion sample for the $(n+1)^{th}$ round, n+1 being less than or equal to a total quantity of samples of the emotion sample sequence; and collecting statistics about a probability of transitioning between two emotion samples for adjacent rounds for the emotion direction sample based on the plurality of sample tuple sequences, the emotion transition relationship being determined from a statistical result based on the historical emotion.

3. The method according to claim 1, wherein the determining an emotion recognition result of the information for recognition based on the target probability corresponding to each of the plurality of candidate emotions comprises:

arranging the plurality of candidate emotions in reverse order based on the target probability, to obtain a to-be-screened emotion sequence;

screening the to-be-screened emotion sequence for a target emotion sequence based on a specified screening parameter, the specified screening parameter comprising at least one of a probability threshold parameter and an emotion quantity parameter; and determining the target emotion sequence and a target probability of each target emotion in the target emotion sequence as the emotion recognition result of the information for recognition.

4. The method according to claim 1 wherein after the integrating the first probability and the second probability to obtain a target probability of the candidate emotion, the method further comprises:

screening, based on the target probability, the plurality of candidate emotions arranged in reverse order for a specified quantity of candidate emotions; and determining the specified quantity of candidate emotions as a current candidate emotion sequence, the current candidate emotion sequence being configured to determine a historical emotion for a next round of prediction.

5. The method according to claim 1, wherein the performing emotion prediction on information for recognition for a current round to obtain a current emotion direction comprises:

performing the emotion prediction on the information for recognition for the current round to obtain a third probability corresponding to each emotion direction;

determining the emotion direction with a highest third probability as a benchmark emotion direction;

determining, as a to-be-selected emotion direction, the emotion direction with a probability difference between the third probability and a third benchmark probability that is less than a probability difference threshold, each of the third benchmark probabilities being the third probability of the benchmark emotion direction; and determining the benchmark emotion direction and the to-be-selected emotion direction as the current emotion direction.

6. The method according to claim 1, wherein the performing emotion prediction on information for recognition for a current round to obtain a current emotion direction and a first probability of each of a plurality of candidate emotions comprises:

extracting a semantic string sequence based on the information for recognition for the current round, each semantic string in the semantic string sequence being used for representing emotion semantics;

performing feature extraction on the semantic string sequence to obtain a to-be-predicted feature; and performing semantic emotion prediction on the to-be-predicted feature, to obtain the current emotion direction and the first probability of each of the plurality of candidate emotions.

7. The method according to claim 6, wherein the feature extraction and the semantic emotion prediction are implemented by using an emotion prediction model, the emotion prediction model being obtained through training by using the following operations:

obtaining an information recognition sample, and obtaining an emotion label and an emotion direction label corresponding to the information recognition sample;

performing the emotion prediction on the information recognition sample based on a to-be-trained prediction model, to obtain an emotion prediction probability and an emotion direction prediction probability, the to-be-trained prediction model being a to-be-trained network model for performing the emotion prediction; and training the to-be-trained prediction model based on a difference between the emotion prediction probability and the emotion label and a difference between the emotion direction prediction probability and the emotion direction label, to obtain the emotion prediction model.

8. The method according to claim 6, wherein the extracting a semantic string sequence based on the information for recognition for the current round comprises:

performing text recognition on the digital audio data for the current round, to obtain a to-be-recognized text;

extracting the semantic strings from the to-be-recognized text; and combining the semantic strings to obtain the semantic string sequence.

9. The method according to claim 1, wherein after the generating the expression rendering data, rendering an expression of the virtual object based on the expression rendering data during playback of the digital audio data.

10. The method according to claim 1, wherein after the determining an emotion recognition result of the information for recognition based on the target probability corresponding to each of the plurality of candidate emotions, the method further comprises:

determining an interactive emotion state based on the emotion recognition result in a case that the information for recognition is an interactive message; and displaying prompt information in a case that the interactive emotion state is a to-be-reviewed emotion state, the prompt information configured to prompt a change to the interactive emotion state.

11. A data processing apparatus, comprising:

a processor; and memory storing computer readable instructions that, when executed, cause the data processing apparatus to:

obtain, for analyzing emotion and for generating expression rendering data for generating an expression of a virtual object on a user computer, digital audio data to be analyzed for emotion recognition;

perform, using an emotion prediction model, emotion prediction on information for recognition, including the digital audio data, for a current round to obtain a current emotion direction and a first probability of each of a plurality of candidate emotions represented in the digital audio data, the current emotion direction being a direction of an emotion of the information for recognition, and each of the candidate emotions being a preset emotion type;

determine a second probability corresponding to each candidate emotion from an emotion transition relationship based on the current emotion direction, the emotion transition relationship representing a probability of transitioning from a historical emotion to each candidate emotion based on an emotion direction, the historical emotion being an emotion predicted through an emotion prediction process performed before the current round;

integrate the first probability and the second probability to obtain a target probability of each candidate emotion, the integrating including:

obtaining a first integration weight negatively correlated with a current round value and a second integration weight positively correlated with the current round value, the current round value representing an order of the current round of emotion prediction process in a plurality of rounds of emotion prediction processes;

obtaining a first integration result of the first probability and the first integration weight;

obtaining a second integration result of the second probability and the second integration weight; and determining a combination result of the first integration result and the second integration result as the target probability of the candidate emotion;

determine an emotion recognition result of the information for recognition based on the target probability corresponding to each of the plurality of candidate emotions;

generate the expression rendering data based on the determined emotion recognition result, the expression rendering data configured to cause the user computer to render the expression of the virtual object; and transmit the expression rendering data to the user computer.

12. The data processing apparatus according to claim 11, wherein, before the determining a second probability corresponding to each candidate emotion from an emotion transition relationship based on the current emotion direction, the data processing apparatus is further configured to:

obtain a plurality of emotion sample sequences and an emotion direction sample of each emotion sample among the emotion sample sequences, each of the emotion sample sequences being N labeled round-consecutive emotion samples, N being a positive integer;

generate a plurality of sample tuple sequences based on the plurality of emotion sample sequences and the emotion direction sample of each emotion sample, each of the sample tuple sequences comprising a plurality of sample tuples, the sample tuples comprising the emotion sample for an $n^{th}$ round, the emotion sample for an $(n+1)^{th}$ round, and the emotion direction sample of the emotion sample for the $(n+1)^{th}$ round, n+1 being less than or equal to a total quantity of samples of the emotion sample sequence; and collect statistics about a probability of transitioning between two emotion samples for adjacent rounds for the emotion direction sample based on the plurality of sample tuple sequences, the emotion transition relationship being determined from a statistical result based on the historical emotion.

13. The data processing apparatus according to claim 11, wherein the determining an emotion recognition result of the information for recognition based on the target probability corresponding to each of the plurality of candidate emotions comprises:

arranging the plurality of candidate emotions in reverse order based on the target probability, to obtain a to-be-screened emotion sequence;

screening the to-be-screened emotion sequence for a target emotion sequence based on a specified screening parameter, the specified screening parameter comprising at least one of a probability threshold parameter and an emotion quantity parameter; and determining the target emotion sequence and a target probability of each target emotion in the target emotion sequence as the emotion recognition result of the information for recognition.

14. The data processing apparatus according to claim 11, wherein after the integrating the first probability and the second probability to obtain a target probability of the candidate emotion, the data processing apparatus is further configured to:

screen, based on the target probability, the plurality of candidate emotions arranged in reverse order for a specified quantity of candidate emotions; and determine the specified quantity of candidate emotions as a current candidate emotion sequence, the current candidate emotion sequence being configured to determine a historical emotion for a next round of prediction.

15. A non-transitory computer-readable storage medium, having a computer-executable instruction stored therein, the computer-executable instruction, when executed by a processor, causing an apparatus to perform:

obtaining, for analyzing emotion and for generating expression rendering data for generating an expression of a virtual object on a user computer, digital audio data to be analyzed for emotion recognition;

performing, using an emotion prediction model, emotion prediction on information for recognition, including the digital audio data, for a current round to obtain a current emotion direction and a first probability of each of a plurality of candidate emotions represented in the digital audio data, the current emotion direction being a direction of an emotion of the information for recognition, and each of the candidate emotions being a preset emotion type;

determining a second probability corresponding to each candidate emotion from an emotion transition relationship based on the current emotion direction, the emotion transition relationship representing a probability of transitioning from a historical emotion to each candidate emotion based on an emotion direction, the historical emotion being an emotion predicted through an emotion prediction process performed before the current round;

integrating the first probability and the second probability to obtain a target probability of each candidate emotion, the integrating including:

obtaining a first integration weight negatively correlated with a current round value and a second integration weight positively correlated with the current round value, the current round value representing an order of the current round of emotion prediction process in a plurality of rounds of emotion prediction processes;

obtaining a first integration result of the first probability and the first integration weight;

obtaining a second integration result of the second probability and the second integration weight; and determining a combination result of the first integration result and the second integration result as the target probability of the candidate emotion;

determining an emotion recognition result of the information for recognition based on the target probability corresponding to each of the plurality of candidate emotions;

generating the expression rendering data based on the determined emotion recognition result, the expression rendering data configured to cause the user computer to render the expression of the virtual object; and transmitting the expression rendering data to the user computer.

16. The non-transitory computer-readable storage medium according to claim 15, wherein, before the determining a second probability corresponding to each candidate emotion from an emotion transition relationship based on the current emotion direction, the computer-executable instruction, when executed by the processor, further cause the apparatus to perform:

obtaining a plurality of emotion sample sequences and an emotion direction sample of each emotion sample among the emotion sample sequences, each of the emotion sample sequences being N labeled round-consecutive emotion samples, N being a positive integer;

generating a plurality of sample tuple sequences based on the plurality of emotion sample sequences and the emotion direction sample of each emotion sample, each of the sample tuple sequences comprising a plurality of sample tuples, the sample tuples comprising the emotion sample for an $n^{th}$ round, the emotion sample for an $(n+1)^{th}$ round, and the emotion direction sample of the emotion sample for the $(n+1)^{th}$ round, n+1 being less than or equal to a total quantity of samples of the emotion sample sequence; and collecting statistics about a probability of transitioning between two emotion samples for adjacent rounds for the emotion direction sample based on the plurality of sample tuple sequences, the emotion transition relationship being determined from a statistical result based on the historical emotion.

17. The non-transitory computer-readable storage medium according to claim 15, wherein the determining an emotion recognition result of the information for recognition based on the target probability corresponding to each of the plurality of candidate emotions comprises:

arranging the plurality of candidate emotions in reverse order based on the target probability, to obtain a to-be-screened emotion sequence;

screening the to-be-screened emotion sequence for a target emotion sequence based on a specified screening parameter, the specified screening parameter comprising at least one of a probability threshold parameter and an emotion quantity parameter; and determining the target emotion sequence and a target probability of each target emotion in the target emotion sequence as the emotion recognition result of the information for recognition.

* * * * *